US011882294B2

(12) United States Patent
Tourapis et al.

(10) Patent No.: US 11,882,294 B2
(45) Date of Patent: Jan. 23, 2024

(54) TECHNIQUES OF MULTI-HYPOTHESIS MOTION COMPENSATION

(71) Applicant: Apple Inc., Cupertino, CA (US)

(72) Inventors: Alexandros Michael Tourapis, Cupertino, CA (US); Yeping Su, Sunnyvale, CA (US); David Singer, San Francisco, CA (US); Hsi-Jung Wu, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/894,309

(22) Filed: Aug. 24, 2022

(65) Prior Publication Data
US 2023/0007272 A1   Jan. 5, 2023

Related U.S. Application Data

(60) Continuation of application No. 16/879,007, filed on May 20, 2020, now Pat. No. 11,463,707, which is a
(Continued)

(51) Int. Cl.
*H04N 19/159* (2014.01)
*H04N 19/105* (2014.01)
(Continued)

(52) U.S. Cl.
CPC ......... *H04N 19/159* (2014.11); *H04N 19/109* (2014.11); *H04N 19/147* (2014.11);
(Continued)

(58) Field of Classification Search
CPC .. H04N 19/159; H04N 19/109; H04N 19/147; H04N 19/176; H04N 19/513; H04N 19/567; H04N 19/70
(Continued)

(56) References Cited

U.S. PATENT DOCUMENTS 6,807,231 B1  10/2004  Wiegand et al.
7,003,035 B2   2/2006  Tourapis et al.
(Continued)

FOREIGN PATENT DOCUMENTS

CN       102131091 A  *  7/2011  ............. H04N 19/46
WO    WO 2010/035733 A1     4/2010
(Continued)

OTHER PUBLICATIONS

International Patent Application No. PCT/US2019/015247; Int'l Preliminary Report on Patentability; dated Aug. 13, 2020; 9 pages.
(Continued)

*Primary Examiner* — Albert Kir
(74) *Attorney, Agent, or Firm* — BakerHostetler

(57) ABSTRACT

The present disclosure describes techniques for coding and decoding video in which a plurality of coding hypotheses are developed for an input pixel block of frame content. Each coding hypothesis may include generation of prediction data for the input pixel block according to a respective prediction search. The input pixel block may be coded with reference to a prediction block formed from prediction data derived according to plurality of hypotheses. Data of the coded pixel block may be transmitted to a decoder along with data identifying a number of the hypotheses used during the coding to a channel. At a decoder, an inverse process may be performed, which may include generation of a counterpart prediction block from prediction data derived according to the hypothesis identified with the coded pixel block data, then decoding of the coded pixel block according to the prediction data.

27 Claims, 5 Drawing Sheets

Related U.S. Application Data division of application No. 16/257,904, filed on Jan. 25, 2019, now abandoned.

(60) Provisional application No. 62/626,276, filed on Feb. 5, 2018.

(51) Int. Cl.
| | | |
|---|---|---|
| *H04N 19/70* | (2014.01) | |
| *H04N 19/176* | (2014.01) | |
| *H04N 19/567* | (2014.01) | |
| *H04N 19/147* | (2014.01) | |
| *H04N 19/109* | (2014.01) | |
| *H04N 19/513* | (2014.01) | |

(52) U.S. Cl.
CPC ......... *H04N 19/176* (2014.11); *H04N 19/513* (2014.11); *H04N 19/567* (2014.11); *H04N 19/70* (2014.11)

(58) Field of Classification Search
USPC .................................................... 375/240.16
See application file for complete search history.

(56) References Cited

U.S. PATENT DOCUMENTS

| | | | |
|---|---|---|---|
| 8,204,127 B2* | 6/2012 | Kim ................ | H04N 19/56 |
| | | | 375/240.16 |
| 8,346,000 B2 | 1/2013 | Flierl et al. | |
| 9,118,929 B2 | 8/2015 | Lin et al. | |
| 10,986,343 B2* | 4/2021 | Yu ................. | H04N 19/159 |
| 11,218,721 B2* | 1/2022 | Chiang ............ | H04N 19/573 |
| 2004/0001546 A1 | 1/2004 | Tourapis et al. | |
| 2006/0268166 A1* | 11/2006 | Bossen ............ | H04N 19/587 |
| | | | 375/E7.199 |
| 2009/0067505 A1 | 3/2009 | Tourapis et al. | |
| 2011/0002388 A1 | 1/2011 | Karczewicz et al. | |
| 2011/0142132 A1 | 6/2011 | Tourapis et al. | |
| 2011/0255600 A1 | 10/2011 | Lin et al. | |
| 2012/0092452 A1 | 4/2012 | Tourapis et al. | |
| 2012/0300845 A1* | 11/2012 | Endresen ........... | H04N 19/557 |
| | | | 375/E7.125 |
| 2013/0003841 A1* | 1/2013 | Minoo .............. | H04N 19/117 |
| | | | 375/E7.243 |
| 2013/0077689 A1* | 3/2013 | Lim ................. | H04N 19/105 |
| | | | 375/240.15 |
| 2013/0121416 A1 | 5/2013 | He et al. | |
| 2013/0176390 A1 | 7/2013 | Chen et al. | |
| 2013/0229485 A1 | 9/2013 | Rusanovskyy et al. | |
| 2013/0287116 A1* | 10/2013 | Helle ............... | H04N 19/196 |
| | | | 375/240.24 |
| 2014/0003489 A1 | 1/2014 | Hannuksela | |
| 2014/0044179 A1 | 2/2014 | Li et al. | |
| 2014/0321551 A1 | 10/2014 | Ye et al. | |
| 2015/0249833 A1 | 9/2015 | Tourapis et al. | |
| 2016/0142728 A1 | 5/2016 | Wang et al. | |
| 2016/0191920 A1 | 6/2016 | Kim et al. | |
| 2016/0269739 A1 | 9/2016 | Tourapis et al. | |
| 2016/0360234 A1 | 12/2016 | Tourapis et al. | |
| 2019/0230350 A1 | 7/2019 | Chen et al. | |
| 2020/0213610 A1* | 7/2020 | Kondo ............. | H04N 19/119 |

FOREIGN PATENT DOCUMENTS

| | | |
|---|---|---|
| WO | WO 2017/197146 A1 | 11/2017 |
| WO | WO 2018/044441 A1 | 3/2018 |
| WO | WO 2019/039283 A1 | 2/2019 |
| WO | WO-2019039283 A1 * | 2/2019 ........... H04N 19/105 |

OTHER PUBLICATIONS

Flierl et al.; "Generalized B Pictures"; Workshop and Exhibition on MPEG-4; Jun. 2002; 4 pages.

Flierl et al.; "Further Investigation of Multihypothesis Motion Pictures"; ITU—Telecommunications Standardization Sector; Study Group 16 Question 6; Document VCEGM40; Mar. 2001; 13 pages.

Zhang et al.; "Overlapped Variable Size Block Motion Compensation"; IEEE Int'l Conf. on Image Processing; Oct. 1997; p. 642-645.

International Patent Application No. PCT/US2019/015247; Int'l Search Report and the Written Opinion; dated Apr. 8, 2019; 15 pages.

* cited by examiner

100

200

300

400

600

700

TECHNIQUES OF MULTI-HYPOTHESIS MOTION COMPENSATION

CROSS REFERENCE TO RELATED APPLICATIONS

This application is a Continuation Application of U.S. patent application Ser. No. 16/879,007 filed May 20, 2020, which is a Divisional Application of U.S. patent application Ser. No.: 16/257,904 filed Jan. 25, 2019, which claims priority to U.S. Provisional Patent Application Ser. No. 62/626,276, filed Feb. 5, 2018 and U.S. Provisional Patent Application Ser. No. 62/625,547, filed Feb. 2, 2018, the disclosures of which are incorporated by reference in their entirety.

BACKGROUND

The present disclosure relates to video coding and, in particular, to video coding techniques that employ multi-hypothesis motion compensation coding (also, "MHMC" coding).

Modern video compression systems, such as MPEG-4 AVC, HEVC, VP9, VP8, and AV1, often employ block-based strategies for video compression. In particular, a rectangular video region, (e.g. an image, a tile, and rows within such regions), are partitioned into rectangular or square blocks (called "pixel blocks" for convenience), and, for each pixel block, a different prediction mode is specified.

MHMC is an inter prediction method where prediction of pixel blocks within a region such as a frame, tile, or slice, may be coded several different ways (called "hypotheses") and the hypotheses are combined together. Thus, a prediction block ŝ for an input pixel block s can be generated using a set of N hypotheses $h_i$ as follows:

$$\hat{s} = \frac{1}{N} \sum_{i=0}^{N-1} w_i \times h_i \qquad \text{(Eq. 1)}$$

Each hypothesis commonly is associated with a reference index, motion vector parameters, and, in some instances, illumination compensation (weighted prediction) parameters. Motion vectors indicate displacement information, i.e. the displacement of the current block in relationship to the reference frame identified for their respective hypotheses. Commonly, such displacement is limited to only translational information. Current MHMC coding systems merge hypotheses via linear models as shown in Eq. 1.

Modern codecs, such as AVC and HEVC, do not force the number of hypotheses for a block in a multihypothesis-predicted frame. Instead, a block can use a single or more hypotheses, or even be predicted using intra prediction. Currently, the number of maximum hypotheses that could be used is limited to two. This is mostly due to the cost of signalling any associated parameters relating to the prediction process but also due to complexity and bandwidth of reading data and reconstructing the final prediction. At lower bitrates, for example, mode and motion information can dominate the overall bitrate of an encoded stream. On the other hand, increasing the number of hypotheses even slightly, i.e. from two to three could result, in considerable, e.g. a 33%, increase in bandwidth in a system, and therefore impact power consumption. Data prefetching and memory management can become more complex and costly. Current coding protocols do not always provide efficient mechanisms to communicate video coding parameters between encoders and decoders.

For example, in many video coding systems, the indication of prediction lists to be used in B slices is performed using a single parameter, which is sent at the prediction unit level of the coding syntax. Such a parameter may indicate whether a block will be using the List0 prediction, List1 prediction, or Bi-prediction. This type of signalling may also include indication of other coding modes as well, such as SKIP and DIRECT modes, Intra, etc. This method, therefore, incurs cost in terms of the signalling overhead to communicate these parameters and the cost can be expected to increase if MHMC coding techniques were employed that expand the number of hypothesis to levels greater than two. Similarly the overhead cost of signalling other coding parameters, such as prediction mode and motion vectors, would increase if MHMC coding technique expand the number of hypotheses to levels greater than two.

Conventionally, modern MHMC coding systems are designed to use exactly the same partitioning and are not permitted to change within the said partitioning. That is, if a block of size 16×16 is said to be utilizing bi-prediction, then a single set of parameters (e.g., reference indices, motion vectors, and weighted parameters), for each hypothesis is signalled and used.

The inventors perceive a need for techniques to improve MHMC coding operations that provide greater flexibility to coding system to represent image data in coding.

DETAILED DESCRIPTION

Aspects of the present disclosure provide techniques for coding and decoding video in which a plurality of coding hypotheses are developed for an input pixel block of frame content. Each coding hypothesis may include generation of prediction data for the input pixel block according to a respective prediction search. The input pixel block may be coded with reference to a prediction block formed from prediction data derived according to plurality of hypotheses. Data of the coded pixel block may be transmitted to a decoder along with data identifying a number of the hypotheses used during the coding to a channel. At a decoder, an inverse process may be performed, which may include generation of a counterpart prediction block from prediction data derived according to the hypothesis identified with the coded pixel block data, then decoding of the coded pixel block according to the prediction data.

Figure 1:
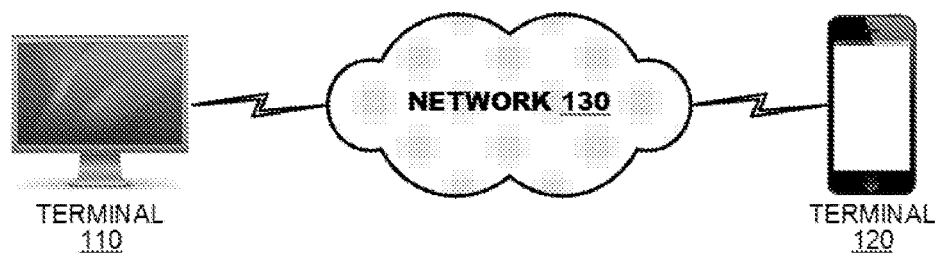
FIG. 1 illustrates a simplified block diagram of a video delivery system 100 according to an aspect of the present disclosure.

FIG. 1 illustrates a simplified block diagram of a video delivery system 100 according to an aspect of the present disclosure. The system 100 may include a plurality of terminals 110, 120 interconnected via a network. The terminals 110, 120 may code video data for transmission to their counterparts via the network. Thus, a first terminal 110 may capture video data locally, code the video data and transmit the coded video data to the counterpart terminal 120 via a channel. The receiving terminal 120 may receive the coded video data, decode it, and render it locally, for example, on a display at the terminal 120. If the terminals are engaged in bidirectional exchange of video data, then the terminal 120 may capture video data locally, code the video data and transmit the coded video data to the counterpart terminal 110 via another channel. The receiving terminal 110 may receive the coded video data transmitted from terminal 120, decode it, and render it locally, for example, on its own display. The processes described can operate on both frame and field frame coding but, for simplicity, the present discussion will describe the techniques in the context of integral frames.

A video coding system 100 may be used in a variety of applications. In a first application, the terminals 110, 120 may support real time bidirectional exchange of coded video to establish a video conferencing session between them. In another application, a terminal 110 may code pre-produced video (for example, television or movie programming) and store the coded video for delivery to one or, often, many downloading clients (e.g., terminal 120). Thus, the video being coded may be live or pre-produced, and the terminal 110 may act as a media server, delivering the coded video according to a one-to-one or a one-to-many distribution model. For the purposes of the present discussion, the type of video and the video distribution schemes are immaterial unless otherwise noted.

In FIG. 1, the terminals 110, 120 are illustrated as a personal computer and a smart phone, respectively, but the principles of the present disclosure are not so limited. Aspects of the present disclosure also find application with various types of computers (desktop, laptop, and tablet computers), computer servers, media players, dedicated video conferencing equipment and/or dedicated video encoding equipment.

The network 130 represents any number of networks that convey coded video data between the terminals 110, 120, including for example wireline and/or wireless communication networks. The communication network may exchange data in circuit-switched or packet-switched channels. Representative networks include telecommunications networks, local area networks, wide area networks, and/or the Internet. For the purposes of the present discussion, the architecture and topology of the network are immaterial to the operation of the present disclosure unless otherwise noted.

Figure 2:
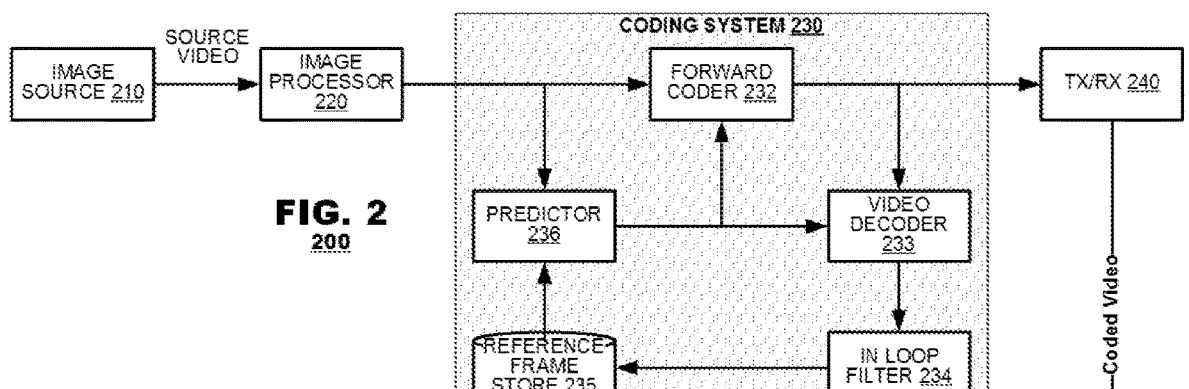
FIG. 2 is a functional block diagram illustrating components of an encoding terminal.

FIG. 2 is a functional block diagram illustrating components of an encoding terminal according to an aspect of the present disclosure. The encoding terminal may include a video source 210, an image processor 220, a coding system 230, and a transmitter 240. The video source 210 may supply video to be coded. The video source 210 may be provided as a camera that captures image data of a local environment, a storage device that stores video from some other source or a network connection through which source video data is received. The image processor 220 may perform signal conditioning operations on the video to be coded to prepare the video data for coding. For example, the preprocessor 220 alter the frame rate, frame resolution, and/or other properties of the source video. The image processor 220 also may perform filtering operations on the source video.

The coding system 230 may perform coding operations on the video to reduce its bandwidth. Typically, the coding system 230 exploits temporal and/or spatial redundancies within the source video. For example, the coding system 230 may perform motion compensated predictive coding in which video frame or field frames are parsed into sub-units (called "pixel blocks," for convenience), and individual pixel blocks are coded differentially with respect to predicted pixel blocks, which are derived from previously-coded video data. A given pixel block may be coded according to any one of a variety of predictive coding modes, such as:

intra-coding, in which an input pixel block is coded differentially with respect to previously coded/decoded data of a common frame;

single prediction inter-coding, in which an input pixel block is coded differentially with respect to data of a previously coded/decoded frame; and multi-hypothesis motion compensation predictive coding, in which an input pixel block is coded predictively using decoded data from two or more sources, via temporal or spatial prediction.

The predictive coding modes may be used cooperatively with other coding techniques, such as Transform Skip coding, RRU coding, scaling of prediction sources, palette coding, and the like.

The coding system 230 may include a forward coder 232, a decoder 233, an in-loop filter 234, a frame buffer 235, and a predictor 236. The coder 232 may apply the differential coding techniques to the input pixel block using predicted pixel block data supplied by the predictor 236. The decoder 233 may invert the differential coding techniques applied by the coder 232 to a subset of coded frames designated as reference frames. The in-loop filter 234 may apply filtering techniques to the reconstructed reference frames generated by the decoder 233. The frame buffer 235 may store the reconstructed reference frames for use in prediction operations. The predictor 236 may predict data for input pixel blocks from within the reference frames stored in the frame buffer.

The transmitter 240 may transmit coded video data to a decoding terminal via a channel CH.

Figure 3:
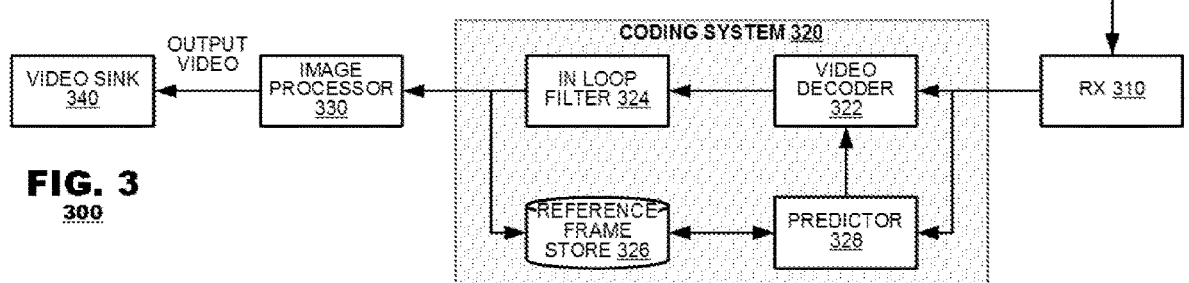
FIG. 3 is a functional block diagram illustrating components of a decoding terminal according to an aspect of the present disclosure.

FIG. 3 is a functional block diagram illustrating components of a decoding terminal according to an aspect of the present disclosure. The decoding terminal may include a receiver 310 to receive coded video data from the channel, a video decoding system 320 that decodes coded data, a post-processor 330, and a video sink 340 that consumes the video data.

The receiver 310 may receive a data stream from the network and may route components of the data stream to appropriate units within the terminal 300. Although FIGS. 2 and 3 illustrate functional units for video coding and decoding, terminals 110, 120 (FIG. 1) often will include coding/decoding systems for audio data associated with the video and perhaps other processing units (not shown). Thus, the receiver 310 may parse the coded video data from other elements of the data stream and route it to the video decoder 320.

The video decoder 320 may perform decoding operations that invert coding operations performed by the coding system 140. The video decoder may include a decoder 322, an in-loop filter 324, a frame buffer 326, and a predictor 328. The decoder 322 may invert the differential coding techniques applied by the coder 142 to the coded frames. The in-loop filter 324 may apply filtering techniques to reconstructed frame data generated by the decoder 322. For example, the in-loop filter 324 may perform various filtering operations (e.g., de-blocking, de-ringing filtering, sample adaptive offset processing, and the like). The filtered frame data may be output from the decoding system. The frame buffer 326 may store reconstructed reference frames for use in prediction operations. The predictor 328 may predict data for input pixel blocks from within the reference frames stored by the frame buffer according to prediction reference data provided in the coded video data.

The post-processor 330 may perform operations to condition the reconstructed video data for display. For example, the post-processor 330 may perform various filtering operations (e.g., de-blocking, de-ringing filtering, and the like), which may obscure visual artifacts in output video that are generated by the coding/decoding process. The post-processor 330 also may alter resolution, frame rate, color space, etc. of the reconstructed video to conform it to requirements of the video sink 340.

The video sink 340 represents various hardware and/or software components in a decoding terminal that may consume the reconstructed video. The video sink 340 typically may include one or more display devices on which reconstructed video may be rendered. Alternatively, the video sink 340 may be represented by a memory system that stores the reconstructed video for later use. The video sink 340 also may include one or more application programs that process the reconstructed video data according to controls provided in the application program. In some aspects, the video sink may represent a transmission system that transmits the reconstructed video to a display on another device, separate from the decoding terminal; for example, reconstructed video generated by a notebook computer may be transmitted to a large flat panel display for viewing.

The foregoing discussion of the encoding terminal and the decoding terminal (FIGS. 2 and 3) illustrates operations that are performed to code and decode video data in a single direction between terminals, such as from terminal 110 to terminal 120 (FIG. 1). In applications where bidirectional exchange of video is to be performed between the terminals 110, 120, each terminal 110, 120 will possess the functional units associated with an encoding terminal (FIG. 2) and each terminal 110, 120 will possess the functional units associated with a decoding terminal (FIG. 3). Indeed, in certain applications, terminals 110, 120 may exchange multiple streams of coded video in a single direction, in which case, a single terminal (say terminal 110) will have multiple instances of an encoding terminal (FIG. 2) provided therein. Such implementations are fully consistent with the present discussion.

Figure 4:
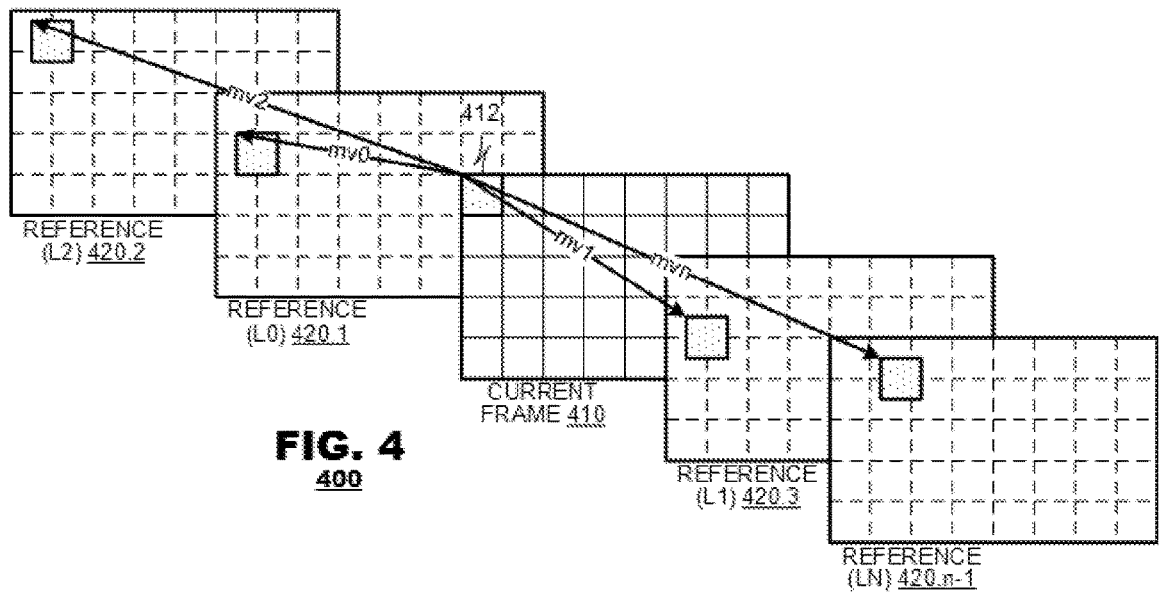
FIG. 4 illustrates exemplary application of MHMC coding.

FIG. 4 illustrates exemplary application of MHMC coding. In FIG. 4, a block 412 in the current frame 410 may be coded with reference to N reference frames 420.1-420.n−1. Motion vectors mv1-mvn may be derived that reference prediction sources in the reference frames 420.1-420.n−1. The prediction sources may be combined as per Eq. 1 to yield a prediction block ŝ that serves as a predictor for block 412.

Figure 5A:
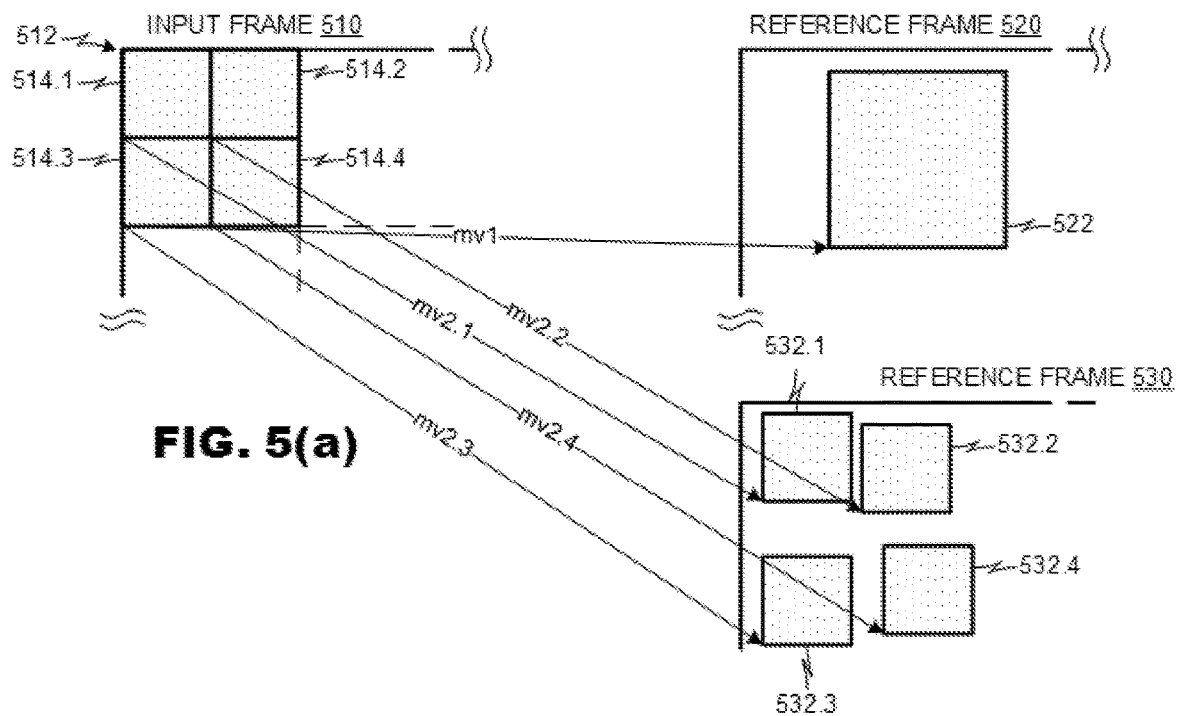
FIGS. 5(a) and 5(b), respectively, illustrate exemplary operation of multi-hypothesis motion compensation coding according to an aspect of the present disclosure.
Figure 5B:
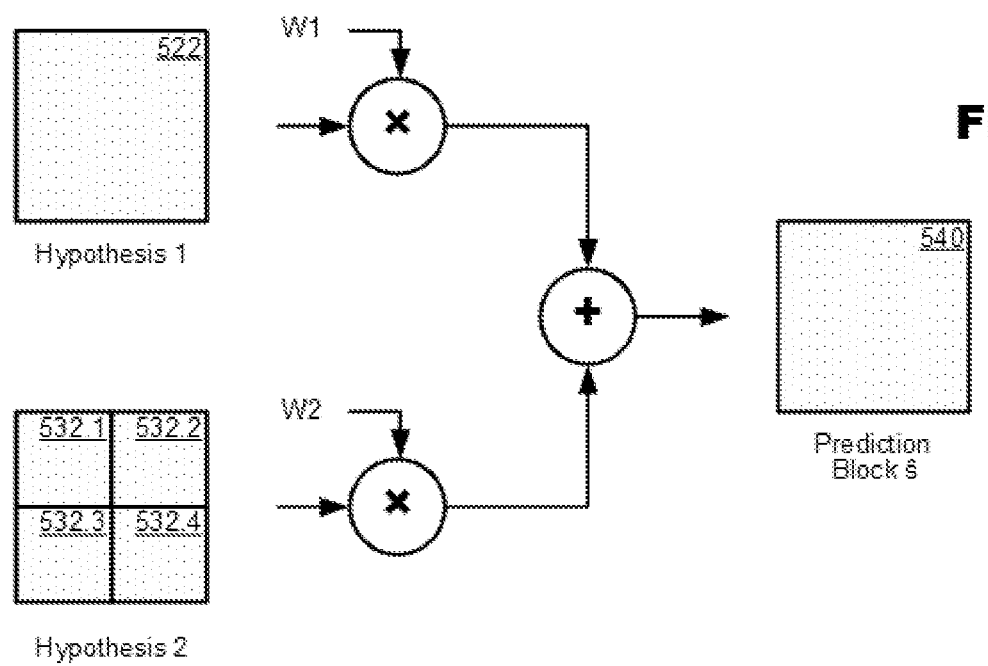

In an aspect of the present disclosure, coders may develop coding hypotheses for an input block using different block sizes. One set of exemplary coding hypotheses is shown in FIGS. 5(a) and 5(b). In FIG. 5(a), an input block 512 from an input frame 510 may be coded using coding hypotheses that use different block sizes. A first hypothesis is represented by motion vector mv1, which codes the input block 512 with reference to a block 522 in a first reference frame 520; the reference block 522 has a size equal to the size of block 512. A second set of hypotheses is represented by motion vectors mv2.1-mv2.4. For the second set of hypotheses, the input block 512 is partitioned into a plurality of sub-blocks (here, four sub-blocks 514.1-514.4), each of which are predictively coded. For ease of illustration, FIG. 5(a) illustrates each of the sub-blocks 514.1-514.4 coded with reference to content from a common reference frame 530, shown as reference blocks 532.1-532.4. In practice, each of the sub-blocks may be predicted independently of the other sub-blocks, which may cause prediction references to be selected from the same or different reference frames (not shown).

FIG. 5(b) illustrates the relationship between the coding hypotheses and a prediction block ŝ 540 that will be used for coding and decoding. Content of the various hypotheses may be merged together to generate the prediction block. In the example of FIG. 5(b), the prediction block 540 may be generated from prediction data contributed by block 522 of the first hypothesis and prediction data contributed by the sub-blocks 532.1-532.4, which may be weighted according to respective weight factors as shown in Eq. 1.

Although FIGS. 5(a) and 5(b) illustrate coding by two hypotheses (the second hypothesis being formed from predictions of four sub-blocks), in principle, MHMC coding may be extended to a greater number of hypotheses. Moreover, although FIG. 5(b) illustrates a linear weighting model, non-linear weighting models also may be used.

Figure 6:
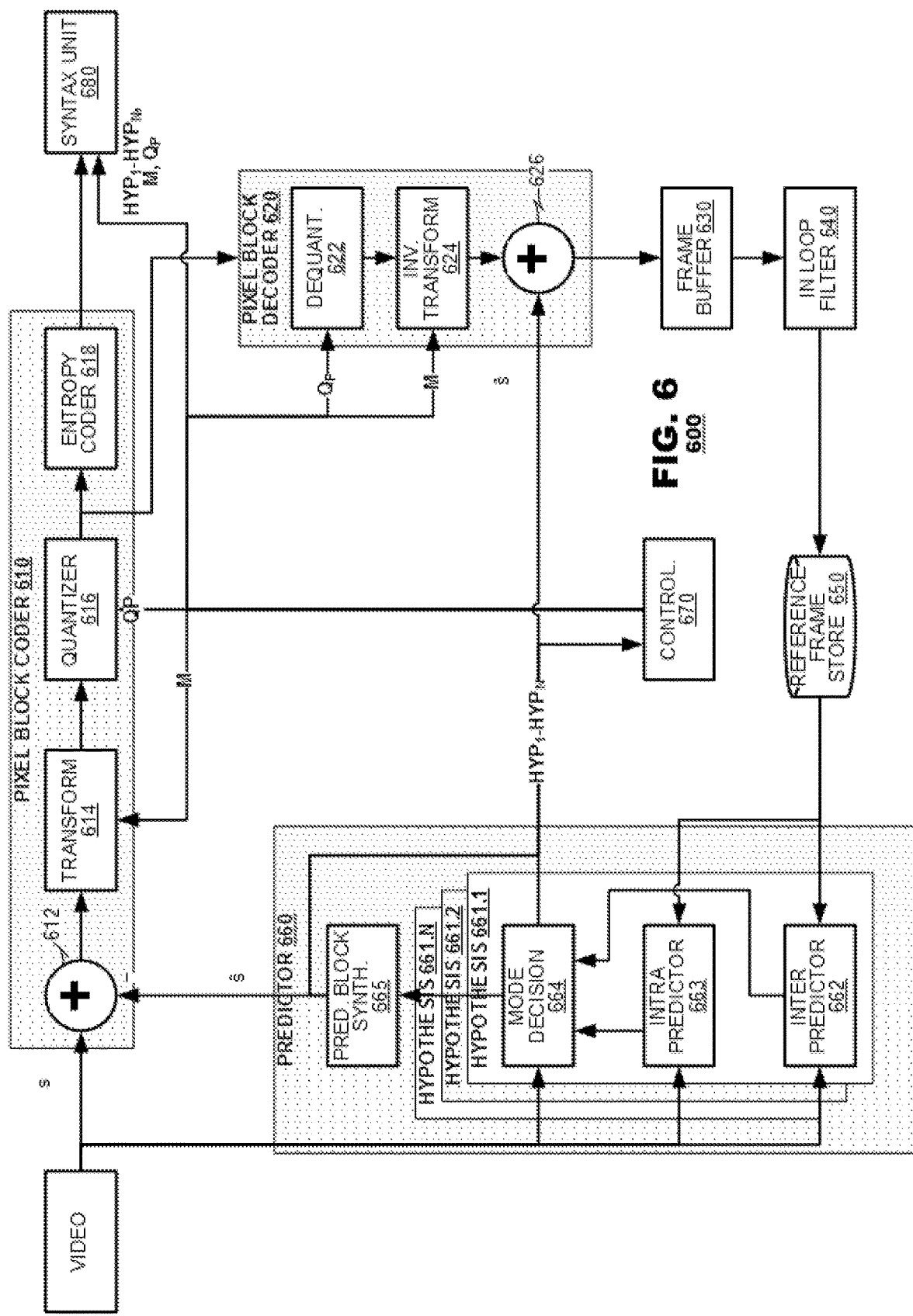
FIG. 6 is a functional block diagram of a coding system according to an aspect of the present disclosure.

FIG. 6 is a functional block diagram of a coding system 600 according to an aspect of the present disclosure. The system 600 may include a pixel block coder 610, a pixel block decoder 620, a frame buffer 630, an in-loop filter system 640, a reference frame store 650, a predictor 660, a controller 670, and a syntax unit 680. The predictor 660 may develop the different hypotheses for use during coding of a newly-presented input pixel block s and it may supply a prediction block ŝ to the pixel block coder 610. The pixel block coder 610 may code the new pixel block by predictive coding techniques and present coded pixel block data to the syntax unit 680. The pixel block decoder 620 may decode the coded pixel block data, generating decoded pixel block data therefrom. The frame buffer 630 may generate reconstructed frame data from the decoded pixel block data. The in-loop filter 640 may perform one or more filtering operations on the reconstructed frame. For example, the in-loop filter 640 may perform deblocking filtering, sample adaptive offset (SAO) filtering, adaptive loop filtering (ALF), maximum likelihood (ML) based filtering schemes, deringing, debanding, sharpening, resolution scaling, and the like. The reference frame store 650 may store the filtered frame, where it may be used as a source of prediction of later-received pixel blocks. The syntax unit 680 may assemble a data stream from the coded pixel block data, which conforms to a governing coding protocol.

In MHMC coding, the predictor 660 may select the different hypotheses from among the different candidate prediction modes that are available under a governing coding syntax. The predictor 660 may decide, for example, the number of hypotheses that may be used, the prediction sources for those hypotheses and, in certain aspects, partitioning sizes at which the predictions will be performed. For example, the predictor 660 may decide whether a given input pixel block will be coded using a prediction block that matches the sizes of the input pixel block or whether it will be coded using prediction blocks at smaller sizes. The predictor 660 also may decide, for some smaller-size partitions of the input block, that SKIP coding will be applied to one or more of the partitions (called "null" coding herein).

The pixel block coder 610 may include a subtractor 612, a transform unit 614, a quantizer 616, and an entropy coder 618. The pixel block coder 610 may accept pixel blocks of input data at the subtractor 612. The subtractor 612 may receive predicted pixel blocks from the predictor 660 and generate an array of pixel residuals therefrom representing a difference between the input pixel block and the predicted pixel block. The transform unit 614 may apply a transform to the sample data output from the subtractor 612, to convert data from the pixel domain to a domain of transform coefficients. The quantizer 616 may perform quantization of transform coefficients output by the transform unit 614. The quantizer 616 may be a uniform or a non-uniform quantizer. The entropy coder 618 may reduce bandwidth of the output of the coefficient quantizer by coding the output, for example, by variable length code words or using a context adaptive binary arithmetic coder.

The transform unit 614 may operate in a variety of transform modes as determined by the controller 670. For example, the transform unit 614 may apply a discrete cosine transform (DCT), a discrete sine transform (DST), a Walsh-Hadamard transform, a Haar transform, a Daubechies wavelet transform, or the like. In an aspect, the controller 670 may select a coding mode M to be applied by the transform unit 615, may configure the transform unit 615 accordingly and may signal the coding mode M in the coded video data, either expressly or impliedly.

The quantizer 616 may operate according to a quantization parameter $Q_P$ that is supplied by the controller 670. In an aspect, the quantization parameter $Q_P$ may be applied to the transform coefficients as a multi-value quantization parameter, which may vary, for example, across different coefficient locations within a transform-domain pixel block. Thus, the quantization parameter $Q_P$ may be provided as a quantization parameters array.

The entropy coder 618, as its name implies, may perform entropy coding of data output from the quantizer 616. For example, the entropy coder 618 may perform run length coding, Huffman coding, Golomb coding, Context Adaptive Binary Arithmetic Coding, and the like.

The pixel block decoder 620 may invert coding operations of the pixel block coder 610. For example, the pixel block decoder 620 may include a dequantizer 622, an inverse transform unit 624, and an adder 626. The pixel block decoder 620 may take its input data from an output of the quantizer 616. Although permissible, the pixel block decoder 620 need not perform entropy decoding of entropy-coded data since entropy coding is a lossless event. The dequantizer 622 may invert operations of the quantizer 616 of the pixel block coder 610. The dequantizer 622 may perform uniform or non-uniform de-quantization as specified by the decoded signal $Q_P$. Similarly, the inverse transform unit 624 may invert operations of the transform unit 614. The dequantizer 622 and the inverse transform unit 624 may use the same quantization parameters $Q_P$ and transform mode M as their counterparts in the pixel block coder 610. Quantization operations likely will truncate data in various respects and, therefore, data recovered by the dequantizer 622 likely will possess coding errors when compared to the data presented to the quantizer 616 in the pixel block coder 610.

The adder 626 may invert operations performed by the subtractor 612. It may receive the same prediction pixel block from the predictor 660 that the subtractor 612 used in generating residual signals. The adder 626 may add the prediction pixel block to reconstructed residual values output by the inverse transform unit 624 and may output reconstructed pixel block data.

As described, the frame buffer 630 may assemble a reconstructed frame from the output of the pixel block decoders 620. The in-loop filter 640 may perform various filtering operations on recovered pixel block data. For example, the in-loop filter 640 may include a deblocking filter, a sample adaptive offset ("SAO") filter, and/or other types of in loop filters (not shown).

The reference frame store 650 may store filtered frame data for use in later prediction of other pixel blocks. Different types of prediction data are made available to the predictor 660 for different prediction modes. For example, for an input pixel block, intra prediction takes a prediction reference from decoded data of the same frame in which the input pixel block is located. Thus, the reference frame store 650 may store decoded pixel block data of each frame as it is coded. For the same input pixel block, inter prediction may take a prediction reference from previously coded and decoded frame(s) that are designated as reference frames. Thus, the reference frame store 650 may store these decoded reference frames.

As discussed, the predictor 660 may supply prediction blocks ŝ to the pixel block coder 610 for use in generating residuals. The predictor 660 may include, for each of a plurality of hypotheses 661.1-661.n, an inter predictor 662, an intra predictor 663, and a mode decision unit 662. The different hypotheses 661.1-661.n may operate at different partition sizes as described above. For each hypothesis, the inter predictor 662 may receive pixel block data representing a new pixel block to be coded and may search reference frame data from store 650 for pixel block data from reference frame(s) for use in coding the input pixel block. The inter-predictor 662 may perform its searches at the partition sizes of the respective hypothesis. Thus, when searching at smaller partition sizes, the inter-predictor 662 may perform multiple searches, one using each of the sub-partitions at work for its respective hypothesis. The inter predictor 662 may select prediction reference data that provides a closest match to the input pixel block being coded. The inter predictor 662 may generate prediction reference metadata, such as prediction block size and motion vectors, to identify which portion(s) of which reference frames were selected as source(s) of prediction for the input pixel block.

The intra predictor 663 may support Intra (I) mode coding. The intra predictor 663 may search from among pixel block data from the same frame as the pixel block being coded that provides a closest match to the input pixel block. The intra predictor 663 also may run searches at the partition size for its respective hypothesis and, when sub-partitions are employed, separate searches may be run for each sub-partition. The intra predictor 663 also may generate prediction mode indicators to identify which portion of the frame was selected as a source of prediction for the input pixel block.

The mode decision unit 664 may select a final coding mode for the hypothesis from the output of the inter-predictor 662 and the inter-predictor 663. The mode decision unit 664 may output prediction data and the coding parameters (e.g., selection of reference frames, motion vectors and the like) for the mode selected for the respective hypothesis. Typically, as described above, the mode decision unit 664 will select a mode that achieves the lowest distortion when video is decoded given a target bitrate. Exceptions may arise when coding modes are selected to satisfy other policies to which the coding system 600 adheres, such as satisfying a particular channel behavior, or supporting random access or data refresh policies.

Prediction data output from the mode decision units 664 of the different hypotheses 661.1-661.N may be input to a prediction block synthesis unit 665, which merges the prediction data into an aggregate prediction block ŝ. As described, the prediction block ŝ may be formed from a linear combination of the predictions from the individual hypotheses, for example, as set forth in Eq. 1, or non-linear combinations may be performed. The prediction block synthesis unit 665 may supply the prediction block ŝ to the pixel block coder 610. The predictor 660 may output to the controller 670 parameters representing coding decisions for each hypothesis.

The controller 670 may control overall operation of the coding system 600. The controller 670 may select operational parameters for the pixel block coder 610 and the predictor 660 based on analyses of input pixel blocks and also external constraints, such as coding bitrate targets and other operational parameters. As is relevant to the present discussion, when it selects quantization parameters $Q_P$, the use of uniform or non-uniform quantizers, and/or the transform mode M, it may provide those parameters to the syntax unit 680, which may include data representing those parameters in the data stream of coded video data output by the system 600. The controller 670 also may select between different modes of operation by which the system may generate reference images and may include metadata identifying the modes selected for each portion of coded data.

During operation, the controller 670 may revise operational parameters of the quantizer 616 and the transform unit 615 at different granularities of image data, either on a per pixel block basis or on a larger granularity (for example, per frame, per slice, per largest coding unit ("LCU") or Coding Tree Unit (CTU), or another region). In an aspect, the quantization parameters may be revised on a per-pixel basis within a coded frame.

Additionally, as discussed, the controller 670 may control operation of the in-loop filter 640 and the prediction unit 660. Such control may include, for the prediction unit 660, mode selection (lambda, modes to be tested, search windows, distortion strategies, etc.), and, for the in-loop filter 640, selection of filter parameters, reordering parameters, weighted prediction, etc.

Figure 7:
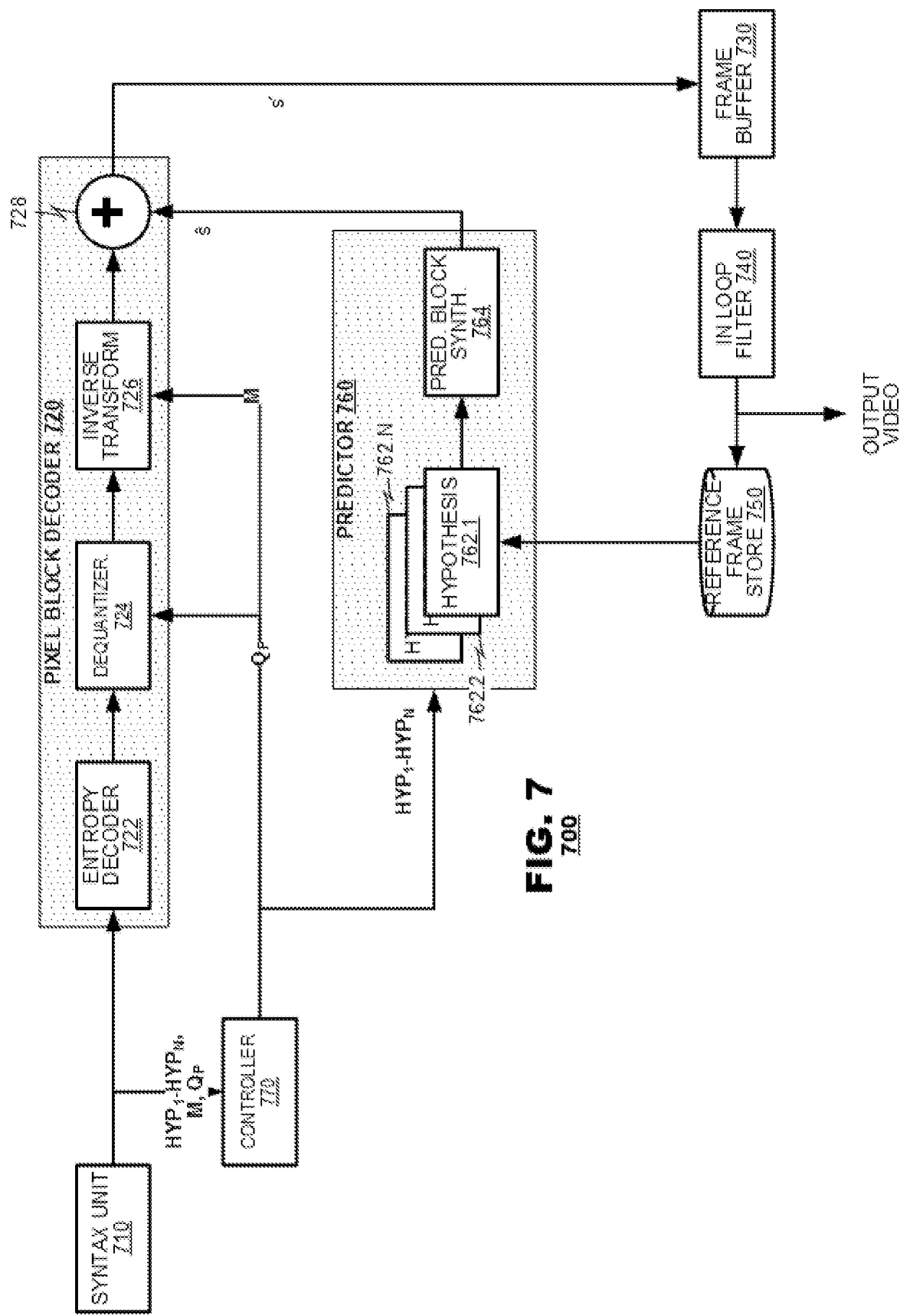
FIG. 7 is a functional block diagram of a decoding system according to an aspect of the present disclosure.

FIG. 7 is a functional block diagram of a decoding system 700 according to an aspect of the present disclosure. The decoding system 700 may include a syntax unit 710, a pixel block decoder 720, an in-loop filter 740, a reference frame store 750, a predictor 760, and a controller 770. As with the encoder (FIG. 6), the pixel block decoder 720 and predictor 760 may be instantiated for each of the hypotheses identified by the coded video data.

The syntax unit 710 may receive a coded video data stream and may parse the coded data into its constituent parts. Data representing coding parameters may be furnished to the controller 770, while data representing coded residuals (the data output by the pixel block coder 610 of FIG. 6) may be furnished to its respective pixel block decoder 720. The predictor 760 may generate a prediction block ŝ from reference data available in the reference frame store 750 according to coding parameter data provided in the coded video data. It may supply the prediction block ŝ to the pixel block decoder. The pixel block decoder 720 may invert coding operations applied by the pixel block coder 610 (FIG. 6). The frame buffer 730 may create a reconstructed frame from decoded pixel blocks s' output by the pixel block decoder 720. The in-loop filter 740 may filter the reconstructed frame data. The filtered frames may be output from the decoding system 700. Filtered frames that are designated to serve as reference frames also may be stored in the reference frame store 750.

The pixel block decoder 720 may include an entropy decoder 722, a dequantizer 724, an inverse transform unit 726, and an adder 728. The entropy decoder 722 may perform entropy decoding to invert processes performed by the entropy coder 618 (FIG. 6). The dequantizer 724 may invert operations of the quantizer 716 of the pixel block coder 610 (FIG. 6). Similarly, the inverse transform unit 726 may invert operations of the transform unit 614 (FIG. 6). They may use the quantization parameters $Q_P$ and transform modes M that are provided in the coded video data stream. Because quantization is likely to truncate data, the pixel blocks s' recovered by the dequantizer 724, likely will possess coding errors when compared to the input pixel blocks s presented to the pixel block coder 610 of the encoder (FIG. 6).

The adder 728 may invert operations performed by the subtractor 610 (FIG. 6). It may receive a prediction pixel block from the predictor 760 as determined by prediction references in the coded video data stream. The adder 728 may add the prediction pixel block to reconstructed residual values output by the inverse transform unit 726 and may output reconstructed pixel block data.

As described, the frame buffer 730 may assemble a reconstructed frame from the output of the pixel block decoder 720. The in-loop filter 740 may perform various filtering operations on recovered pixel block data as identified by the coded video data. For example, the in-loop filter 740 may include a deblocking filter, a sample adaptive offset ("SAO") filter, and/or other types of in loop filters. In this manner, operation of the frame buffer 730 and the in loop filter 740 mimics operation of the counterpart frame buffer 630 and in loop filter 640 of the encoder 600 (FIG. 6).

The reference frame store 750 may store filtered frame data for use in later prediction of other pixel blocks. The reference frame store 750 may store decoded frames as it is coded for use in intra prediction. The reference frame store 750 also may store decoded reference frames.

As discussed, the predictor 760 may supply the prediction blocks ŝ to the pixel block decoder 720. The predictor 760 may retrieve prediction data from the reference frame store 750 for each of the hypotheses represented in the coded video data (represented by hypothesis predictors 762.1-762.n). A prediction block synthesis unit 764 may generate an aggregate prediction block ŝ from the prediction data of the different hypothesis. In this manner, the prediction block synthesis unit 764 may replicate operations of the synthesis unit 665 from the encoder (FIG. 6). The predictor 760 may supply predicted pixel block data as determined by the prediction reference indicators supplied in the coded video data stream.

The controller 770 may control overall operation of the coding system 700. The controller 770 may set operational parameters for the pixel block decoder 720 and the predictor 760 based on parameters received in the coded video data stream. As is relevant to the present discussion, these operational parameters may include quantization parameters $Q_P$ for the dequantizer 724 and transform modes M for the inverse transform unit 710. As discussed, the received parameters may be set at various granularities of image data, for example, on a per pixel block basis, a per frame basis, a per slice basis, a per LCU/CTU basis, or based on other types of regions defined for the input image.

Techniques of Multi-Hypothesis Motion Compensation

In an aspect, encoders may provide signalling in a coded bit stream to identify the number of hypotheses that are used to code frame data for each such hypothesis. For example, when frame data is to be coded by MHMC, coded video data may identify a number of hypotheses using a count value. When a given hypothesis can be coded as prediction blocks of different sizes, coded video data may contain data identifying such prediction block sizes.

An exemplary syntax for such identifications is provided in Table 1 below:

TABLE 1

```
if(type == MH ) {
  number_of_hypotheses_minus2                              ue(v)
  for( i = 0; i < number_of_lists_minus2 + 2; i++ ) {
    list_prediction_implicit_present_flag[i ]               u(1)
    log2_min_luma_hypothesis_block_size_minus2 [i ]         ue(v)
    log2_diff_max_min_luma_hypothesis_block_size [i ]       ue(v)
  }
}
```

Here, type corresponds to the slice type. If MH, then that slice is indicated as a multihypothesis slice that permits 2 or more hypotheses to be used for prediction. The field number_of_hypotheses_minus2 may identify the number of hypotheses available for coding. The field list_prediction_implicit_present_flag[i] enforces that a hypothesis from list i is always present for all CTUs or at least for all inter CTUs in the current slice. The fields log 2_min_luma_hypothesis_block_size_minus2[i] and log 2_diff_max_min_luma_hypothesis_block_size[i] respectively may identify minimum and maximum sizes of prediction blocks that are available for each such hypothesis. Providing minimum and maximum sizes for the prediction blocks may constrain coding complexity by avoiding MHMC combinations outside the indicated size ranges.

The foregoing example permits use of multiple hypotheses for block sizes starting from $M_L \times N_L$ to $M_H \times N_H$, where $M_L$, $N_L$, $M_H$, $N_H$ are defined, respectively, by the log 2_min_luma_hypothesis_block_size_minus2[i] and log 2_diff_max_min_luma_hypothesis_block_size[i] fields. For example, if the minimum size for a hypothesis from list i was defined as 16 and the maximum size was defined as 64, then this syntax would permit prediction block sizes from list i with block sizes of, for example, 16×16, 32×32, and 64×64 pixels. If rectangular partitions were also permitted for prediction, these would also be limited within the specified resolutions. Of course, other variants would be supported by the syntax of Table 1. For example, prediction block sizes may be defined starting from a size 32×32 and above.

The syntax identified in Table 1 may be provided at different levels of coded video data, such as at the sequence-, picture-, slice-level, a segment, or for a group of CTUs. Table 12 below illustrates application of the syntax to an exemplary HEVC-style slice syntactic element. Moreover, the syntax elements may be assigned to these levels dynamically based on coding decision performed by an encoder. In this manner, the syntax increases flexibility in the encoder and permits the encoder to conserve signalling overhead when the syntax elements may be provided in higher-level elements of the coding protocol.

Table 2, for example, provides an example in which slice segment header syntax is extended to include parameters that indicate for which block sizes a particular hypothesis will be valid or not. A single parameter is identified for the minimum width and height, i.e. log 2_min_luma_hypothesis_block_size_minus2[i] as well as for the maximum, i.e. log 2_diff_max_min_luma_hypothesis_block_size_minus2[i]. The list_prediction_implicit_present_flag[i] discussed above is provided as well. Independent parameters for the width and height could also be used. Additional elements that are impacted by the use of Multihypothesis prediction instead of biprediction, such as the number of references for each list (num_ref_idx_active_minus1_list[i]), the use of zero motion prediction (mvd_list_zero_flag[i]), and from which list the collocated temporal motion vector will be derived.

TABLE 2

Exemplary Slice Segment Header to support Multihypothesis prediction

| | Descriptor |
|---|---|
| slice_segment_header( ) { | |
|   first_slice_segment_in_pic_flag | u(1) |
|   if( nal_unit_type >= BLA_W_LP && nal_unit_type <= RSV_IRAP_VCL23 ) | |
|     no_output_of_prior_pics_flag | u(1) |
|   slice_pic_parameter_set_id | ue(v) |
|   if( !first_slice_segment_in_pic_flag ) { | |
|     if( dependent_slice_segments_enabled_flag ) | |
|       dependent_slice_segment_flag | u(1) |
|     slice_segment_address | u(v) |
|   } | |
|   if( !dependent_slice_segment_flag ) { | |
|     for( i = 0; i < num_extra_slice_header_bits; i++ ) | |
|       slice_reserved_flag[ i ] | u(1) |
|     slice_type | ue(v) |
|     if( slice_type == MH ) { | |
|       number_of_lists_minus2 | ue(v) |
|       for( i = 0; i < number_of_lists_minus2 + 2; i++ ) { | |
|         list_prediction_implicit_present_flag[i ] | u(1) |
|         log2_min_luma_hypothesis_block_size_minus2 [i ] | ue(v) |
|         log2_diff_max_min_luma_hypothesis_block_size [i ] | ue(v) |
|       } | |
|     } | |
|     else { /* slice_type == P */ | |
|       number_of_lists_minus2 = −1 | |
|       list_prediction_implicit_present_flag[ 0 ] = 1 | |
|     } | |
|   if( output_flag_present_flag ) | |

TABLE 2-continued

Exemplary Slice Segment Header to support Multihypothesis prediction

| | Descriptor |
|---|---|
|     pic_output_flag | u(1) |
| if( separate_colour_plane_flag == 1 ) | |
|     colour_plane_id | u(2) |
| if( nal_unit_type != IDR_W_RADL && nal_unit_type != IDR_N_LP ) { | |
|     slice_pic_order_cnt_lsb | u(v) |
|     short_term_ref_pic_set_sps_flag | u(1) |
|     if( !short_term_ref_pic_set_sps_flag ) | |
|         st_ref_pic_set( num_short_term_ref_pic_sets ) | |
|     else if( num_short_term_ref_pic_sets > 1 ) | |
|         short_term_ref_pic_set_idx | u(v) |
|     if( long_term_ref_pics_present_flag ) { | |
|         if( num_long_term_ref_pics_sps > 0 ) | |
|         num_long_term_sps | ue(v) |
|         num_long_term_pics | ue(v) |
|         for( i = 0; i < num_long_term_sps + num_long_term_pics; i++ ) { | |
|             if( i < num_long_term_sps ) { | |
|                 if( num_long_term_ref_pics_sps > 1 ) | |
|                 lt_idx_sps[ i ] | u(v) |
|         } else { | |
|             poc_lsb_lt[ i ] | u(v) |
|             used_by_curr_pic_lt_flag[ i ] | u(1) |
|         } | |
|         delta_poc_msb_present_flag[ i ] | u(1) |
|         if( delta_poc_msb_present_flag[ i ] ) | |
|             delta_poc_msb_cycle_lt[ i ] | ue(v) |
|         } | |
|     } | |
|     if( sps_temporal_mvp_enabled_flag ) | |
|         slice_temporal_mvp_enabled_flag | u(1) |
| } | |
| if( sample_adaptive_offset_enabled_flag ) { | |
|     slice_sao_luma_flag | u(1) |
|     if( ChromaArrayType != 0 ) | |
|         slice_sao_chroma_flag | u(1) |
| } | |
| if( slice_type == P || slice_type == MH ) { | |
|     num_ref_idx_active_override_flag | u(1) |
|     if( num_ref_idx_active_override_flag ) { | |
|         for( i = 0; i < number_of_lists_minus2 + 2; i++ ) | |
|             num_ref_idx_ active_minus1_list[ i ] | ue(v) |
|     } | |
|     if( lists_modification_present_flag && NumPicTotalCurr > 1 ) | |
|         ref_pic_lists_modification( ) | |
|     mvd_list_zero_flag[ 0 ] = 0 | |
|     for( i = 1; i < number_of_lists_minus2 + 2; i++ ) | |
|         mvd_list_zero_flag[ i ] | u(1) |
|     if( cabac_init_present_flag ) | |
|         cabac_init_flag | u(1) |
|     if( slice_temporal_mvp_enabled_flag ) { | |
|         if( slice_type == MH ) | |
|             collocated_from_list | ue(v) |
|         else | |
|             collocated_from_list = 0 | ue(v) |
|         if( (num_ref_idx_active_minus1_list[ collocated_from_list ] > 0 ) | |
|             collocated_ref_idx | ue(v) |
|     } | |
|     if( ( weighted_pred_flag && slice_type == P ) || | |
|         ( weighted_mh_pred_flag && slice_type == MH ) ) | |
|         pred_weight_table( ) | |
|     five_minus_max_num_merge_cand | ue(v) |
|     if( motion_vector_resolution_control_idc == 2 ) | |
|         use_integer_mv_flag | u(1) |
| } | |
| slice_qp_delta | se(v) |
| if( pps_slice_chroma_qp_offsets_present_flag ) { | |
|     slice_cb_qp_offset | se(v) |
|     slice_cr_qp_offset | se(v) |
| } | |
| if( pps_slice_act_qp_offsets_present_flag ) { | |
|     slice_act_y_qp_offset | se(v) |
|     slice_act_cb_qp_offset | se(v) |
|     slice_act_cr_qp_offset | se(v) |
| } | |
| if( chroma_qp_offset_list_enabled_flag ) | |

TABLE 2-continued

Exemplary Slice Segment Header to support Multihypothesis prediction

|  | Descriptor |
|---|---|
|     cu_chroma_qp_offset_enabled_flag | u(1) |
|   if( deblocking_filter_override_enabled_flag ) |  |
|     deblocking_filter_override_flag | u(1) |
|   if( deblocking_filter_override_flag ) { |  |
|     slice_deblocking_filter_disabled_flag | u(1) |
|     if( !slice_deblocking_filter_disabled_flag ) { |  |
|       slice_beta_offset_div2 | se(v) |
|       slice_tc_offset_div2 | se(v) |
|     } |  |
|   } |  |
|   if( pps_loop_filter_across_slices_enabled_flag && |  |
|     ( slice_sao_luma_flag \| \| slice_sao_chroma_flag \| \| |  |
|     !slice_deblocking_filter_disabled_flag ) ) |  |
|     slice_loop_filter_across_slices_enabled_flag | u(1) |
| } |  |
| if( tiles_enabled_flag \| \| entropy_coding_sync_enabled_flag ) { |  |
|   num_entry_point_offsets | ue(v) |
|   if( num_entry_point_offsets > 0 ) { |  |
|     offset_len_minus1 | ue(v) |
|     for( i = 0; i < num_entry_point_offsets; i++ ) |  |
|       entry_point_offset_minus1[ i ] | u(v) |
|   } |  |
| } |  |
| if( slice_segment_header_extension_present_flag ) { |  |
|   slice_segment_header_extension_length | ue(v) |
|   for( i = 0; i < slice_segment_header_extension_length; i++) |  |
|     slice_segment_header_extension_data_byte[ i ] | u(8) |
| } |  |
| byte_alignment( ) |  |
| } |  |

The foregoing syntax table also provides examples of other coding parameters that may be included. The num_ref_idx_active_minus1_list[i] parameter may specify a maximum reference index for a respective reference picture list that may be used to decode a slice. The collocated_from_list parameter, for example, may identify a list from which temporal motion vector prediction is derived. The collocated_ref_idx parameter may identify a reference index of the collocated picture used for temporal motion vector prediction.

MHMC coding techniques may be represented in coding of a pixel block using a syntax as shown, for example, in Table 3. In this example, prediction units may be defined for each prediction block in use, and their sizes may be identified using the nPbW, nPbH values. Unlike HEVC, which limits prediction to up to two lists, and where the prediction type is indicated with a mode parameter, here the use of a particular hypothesis is indicated through a list specific flag, i.e. list_pred_idc_flag[i][x0][y0]. This flag is either derived based on syntax components signalled earlier in higher levels or based on the utilization of other lists, or explicitly signalled in the bit stream. If this flag is one then that hypothesis will be used in combination with other enabled hypotheses, but if it is set to zero then a hypothesis from that list will not be considered. Depending on its value other parameters, such as reference indices motion vectors, but also other information that may be signalled at this level, such as illumination compensation parameters, can then be signalled.

TABLE 3

HEVC-style Prediction Unit Syntax of HEVC To Accommodate MHMC

|  | Descriptor |
|---|---|
| prediction_unit( x0, y0, nPbW, nPbH ) { |  |
|   if( cu_skip_flag[ x0 ][ y0 ] ) { |  |
|     if( MaxNumMergeCand > 1 ) |  |
|       merge_idx[ x0 ][ y0 ] | ae(v) |
|   } else { /* MODE_INTER */ |  |
|     merge_flag[ x0 ][ y0 ] | ae(v) |
|     if( merge_flag[ x0 ][ y0 ] ) { |  |
|       if( MaxNumMergeCand > 1 ) |  |
|         merge_idx[ x0 ][ y0 ] | ae(v) |
|     } else { |  |
|       set_lists = 0 |  |
|       for( i = 0; i < number_of_lists_minus2 + 2; i++ ) { |  |
|         min_luma_block = (log2_min_luma_hypothesis_block_size_minus2 [ i ] + 2) |  |
|         max_luma_block = min_luma_block + |  |

TABLE 3-continued

HEVC-style Prediction Unit Syntax of HEVC To Accommodate MHMC

| | Descriptor |
|---|---|
| ```
log2_diff_max_min_luma_hypothesis_block_size [ i ]
    if( (nPbW< (1 << min_luma_block)) || (nPbH < (1 << min_luma_block)) ||
        (nPbW > (1 << max_luma_block)) || (nPbH > (1 << max_luma_block)))
        list_pred_idc_flag[ i ][ x0 ][ y0 ] = 0
    else if( !list_prediction_implicit_present_flag [ i ] && ( ( i <
number_of_lists_minus2 + 1 ) | | set_lists > 0)
        list_pred_idc_flag[ i ][ x0 ][ y0 ]
    else
        list_pred_idc_flag[ i ] [ x0 ][ y0 ] = 1
    set_lists += list_pred_idc_flag[ i ] [ x0 ][ y0 ]
}
for( i = 0; i < number_of_lists_minus2 + 2; i++ ) {
    if( list_pred_idc_flag[ i ] [ x0 ][ y0 ] ) {
        if( num_ref_idx_ active_minus1_list[ i ] > 0 )
            ref_idx_list[ i ][ x0 ][ y0 ]
        if( mvd_list_zero_flag[ i ] && set_lists > 1 ) {
            MvdList[ i ][ x0 ][ y0 ][ 0 ] = 0
            MvdList[ i ] [ x0 ][ y0 ][ 1 ] = 0
        } else
            mvd_coding( x0, y0, i )
        mvp_list_flag[ i ][ x0 ][ y0 ]
    }
  }
 }
}
``` | <br><br><br><br><br><br><br>ae(v)<br><br><br><br><br><br>ae(v)<br><br><br><br><br>ae(v) |

In this example, the field list_pred_idc_flag[i][x0][y0] indicates whether a list corresponding to hypothesis i is to be used for coding, ref_idx_list[i][x0][y0] indicates an index into the respective list i identifying a reference frame that was used for prediction, and mvp_list_flag[i][x0][y0] indicates a motion vector predictor index of list i.

In another aspect, a coding syntax may impose a restriction on the number of "minimum" references that can be combined together. For example, the syntax may restrict any hypotheses from list index i, with i>1, to be used only when a list with a lower index also is used or, alternatively, if all lower index lists are present. All of these restrictions could also be supported or defined by either implicitly imposing them for all bit streams or by signalling the restrictions for multihypothesis prediction in a higher syntax level. As discussed below, aspects of the present disclosure accommodate such restrictions as multihypothesis modes.

For example, an encoder may signal a parameter mh_mode in the sequence, picture, or slice header, which will indicate the mode of/restrictions imposed on multihypothesis prediction. For example, when or if mh_mode==0, no further restrictions are performed. If mh_mode==1, then an encoder may signal lists with index i>1, only and only if all other lists with index j<i are also used. Otherwise, those are implicitly set to not present. Other modes could be also defined in addition or in place of the above modes.

In such a case, coding syntax for the prediction unit may be represented as follows:

TABLE 4

HEVC-style Alternative Prediction Unit Syntax Modified To Accommodate MHMC

| | Descriptor |
|---|---|
| ```
prediction_unit( x0, y0, nPbW, nPbH ) {
    if( cu_skip_flag[ x0 ][ y0 ] ) {
        if( MaxNumMergeCand > 1 )
            merge_idx[ x0 ][ y0 ]
    }else{ /* MODE_INTER */
        merge_flag[ x0 ][ y0 ]
        if( merge_flag[ x0 ][ y0 ] ) {
            if( MaxNumMergeCand > 1 )
                merge_idx[ x0 ][ y0 ]
        } else {
            set_lists = 0
            for( i = 0; i < number_of_lists_minus2 + 2; i++ ) {
                min_luma_block = (log2_min_luma_hypothesis_block_size_minus2 [ i ] + 2)
                max_luma_block = min_luma_block +
                log2_diff_max_min_luma_hypothesis_block_size [ i ]
                if( (nPbW < (1 << min_luma_block)) || (nPbH < (1 << min_luma_block)) ||
                    (nPbW > (1 << max_luma_block)) || (nPbH > (1 << max_luma_block)) ||
                    (mh_mode == 1 && i > 1 && set_lists < i))
                    list_pred_idc_flag[ i ][ x0 ][ y0 ] = 0
``` | <br><br><br>ae(v)<br><br>ae(v)<br><br><br>ae(v) |

TABLE 4-continued

HEVC-style Alternative Prediction Unit Syntax Modified To Accommodate MHMC

| | Descriptor |
|---|---|
|     else if (mh_mode == 1 && i == 1 && set_lists == 0)<br>        list_pred_idc_flag[ i ] [ x0 ][ y0 ] = 1<br>    else if( !list_prediction_implicit_present_flag [ i ] && ( ( i <<br>    number_of_lists_minus2 + 1) | | set_lists > 0)<br>        list_pred_idc_flag[ i ][ x0 ][ y0 ] | |
| | ae(v) |
|     else<br>        list_pred_idc_flag[ i ] [ x0 ][ y0 ] = 1<br>    set_lists += list_pred_idc_flag[ i ] [ x0 ][ y0 ]<br>  }<br>  for( i = 0; i < number_of_lists_minus2 + 2; i++ ) {<br>    if( list_pred_idc_flag[ i ] [ x0 ][ y0 ] ) {<br>      if( num_ref_idx_ active_minus1_list[ i ] > 0 )<br>        ref_idx_list[ i ][ x0 ][ y0 ] | |
| | ae(v) |
|       if( mvd_list_zero_flag[ i ] && set_lists > 1 ) {<br>        MvdList[ i ][ x0 ][ y0 ][ 0 ] = 0<br>        MvdList[ i ] [ x0 ][ y0 ][ 1 ] = 0<br>      } else<br>        mvd_coding( x0, y0, i )<br>      mvp_list_flag[ i ][ x0 ][ y0 ] | |
| | ae(v) |
|     }<br>  }<br>  }<br>  }<br>} | |

In this example, the field list_pred_idc_flag[i][x0][y0] indicates whether a list corresponding to hypothesis i is to be used for coding, ref_idx_list[i][x0][y0] indicates an index into the respective list i identifying a reference frame that was used for prediction, and mvp_list_flag[i][x0][y0] indicates a motion vector predictor index of list i. Unlike the syntax presented in Table 3 it can be seen that mh_mode is now also considered to determine how and if multihypothesis prediction will be performed.

As described, the foregoing techniques reduce the overhead for signalling coding mode for multihypothesis prediction, i.e. when to use and when not to use a certain hypothesis. To further reduce signalling overhead, coding syntax may employ additional techniques, as described below.

In another aspect, motion parameters of a given hypothesis may be derived through relationship(s) with other hypotheses. For example, motion parameters or their differential values may be set to have a value of zero using the mvd_list_zero_flag parameter. Moreover, the syntax may be designed so it can specify any of the following cases for implicit derivation of motion parameters for a list:

a. Enforce all motion parameters for a particular list index to be zero or a fixed vector (sent at a higher syntax layer, such as the sequence or picture parameter sets, or the slice header).

b. Enforce either the vertical or horizontal motion vector component value of a particular list index to a fixed (zero or otherwise) value. Again such information could be signalled at a higher syntax layer.

c. Set illumination compensation (weighted prediction) parameters to fixed values for all or for some of the lists (e.g. for lists with i>1). If explicit weighting parameters are present at the block level, the syntax may have explicit parameters only for the earlier lists (i<2) and, for all others, illumination parameters could be derived from the parameters of the earlier lists or fixed to default weighting parameters. Parameters could also be derived from previously-decoded neighbouring samples with corresponding increases to the complexity of the codec.

d. Establish a mathematical relationship of the motion vectors of one list i with the motion vectors of another, earlier-in-presence list j (j<i). The relationship may also be related to the ref_idx and its associated picture order count or other parameter that may be available in the codec, and which parameter indicates a form of temporal distance relationships between references. Alternatively, the relationship may be based on signalled parameters in a higher level syntax, e.g. a linear model using parameters alpha ($\alpha$) and beta ($\beta$). These parameters could also be vector values and have different elements for the horizontal and vertical motion vector elements. These parameters could then be used to weigh and offset the decoded motion parameters of list j. For example, a motion vector $mv_i$ may be set as $\vec{mv_i} = \alpha \times \vec{mv_j} + \beta$. Other non-linear mathematical models may also be employed.

e. Mathematical relationships may be also defined by providing the relationships of a list with more than one other lists. In that case, the motion vector may be computed as $$\vec{mv_i} = \frac{1}{i}\sum\nolimits_{j=0}^{j<i}\alpha_j \times \vec{mv_j} + \beta_j, \quad \text{(Eq. 2)}$$

assuming a linear model. Again, non linear models could also be used.

f. Motion vectors for a list could be derived also through motion vector chaining. In particular, the syntax may represent motion parameters for a block at location (x,y) in frame i, using a reference j, if for another list a motion vector is provided pointing to another reference k, in which the co-located block, also at location (x,y) uses a motion vector that points at reference j. In such case, $MV_{i,j}$ (x,y)=$MV_{i,k}$ (x,y)+$MV_{k,j}$ (x,y). Motion vector chaining could be considered using multiple vectors, if these are available through other lists.

$$\vec{mv_{1,j}(x,y)} = \Sigma_{m=0}^{m<n}(\alpha_j \times (\vec{mv_{1,k_m}(x,y)} + \vec{mv_{k_m,j}(x,y)})) \quad \text{(Eq. 3)}$$

Chaining could also include multiple references if the path to the target reference is not immediate, e.g. $MV_{i,j}(x,y) = MV_{i,k}(x,y) + MV_{m,j}(x,y) + MV_{m,j}(x,y)$. In effect, a motion vector from a frame at time t may reference data in a frame at time t−2 by building an aggregate motion vector from a first motion vector that references an intermediate frame at time t−1 (e.g., a motion vector from time t to t−1) and a second motion vector the references the destination frame at time t−2 from the intermediate frame (e.g., a motion vector from time t−1 to t−2).

g. Motion acceleration may also be considered to provide a basis to predict current motion vectors. For example, the predictor of a motion vector may be computed for frame i of a block at location (x,y) from frame i−1, and assuming that all previous partitions used references frames that were only of a distance of 1, as follows:

$$MV_{(i,i-1)}(x,y) = 2 * MV_{(i-1,i-2)}(x,y) - MV_{(i-2,i-3)}(x,y) \quad \text{(Eq. 4)}$$

Of course, if the frames have different distance relationships, the acceleration computation would account for such relationships.

h. In another aspect, motion vector derivation may be based on partitions in other frames and their actual motion path. Such process involves higher complexity since now the projected area may not correspond to a block used for coding. Such strategy is used, for example, in the AVS video coding standards. Furthermore, the projected area may contain multiple subpartitions each having its own motion. In such cases, encoders and decoders either may combine all the vectors together or may use all the vectors as independent hypotheses and subpartition the block being coded based on these hypotheses. Combining the vectors could be done using a variety of methods, e.g. using simple averaging, using weighted averaging based on the number of pixels that have a certain motion, by making use of median filtering, selection of the mode candidate, etc. Moreover, chaining could persist across multiple pictures, with the number of pictures to be chained constrained by the codec at a higher level if desired. In such a case also, if there is no usable vector, such as the block being intra encoded, chaining could terminate.

i. Non-linear combinations of prediction samples may be performed instead of or in addition to using straight averaging or weighted averaging. For example different predictors $h_i(x,y)$ may be combined non-linearly using an equation of the form:

$$S(x, y) = \frac{1}{N} \sum_{i=0}^{i<N} (h_i(x, y) \times f(h_i(x, y) - ref(x, y))) \quad \text{(Eq. 5)}$$

Here, ref(x,y) may represent an anchor predictor that is most correlated with the current signal and f is the non-linear function. The function could be for example a gaussian function or some other similar function. For example, the anchor predictor can be chosen from the most adjacent frame temporally, or the predictor associated with the smallest $Q_p$. The anchor predictor could also be indicated at a higher syntax structure, e.g. the slice header.

j. In another aspect, the different predictors for multihypothesis prediction can be weighted based also on location of the current sample and its distance to the blocks used for predicting the hypotheses motion vectors. In particular, for a block that is predicted using two hypotheses, where the first hypothesis used the motion information from the left block as its predictor and the second hypothesis used the top block as its predictor, the first hypothesis may be weighted to have higher impact on samples that are closer to the left edge of the block and the second hypothesis may be weighted to have higher impact on samples that are closer to the top edge of the block. In another example, if a block has predictors from above, from the left, from the above left, and from above right, as well as a temporal predictor, weights may be applied to each of these predictors. The temporal hypothesis may be assigned a single weight everywhere, whereas the hypothesis from the left may have relatively large weights on the left boundaries of the block with weight reductions at locations towards the right of the reconstructed block. Analogous weight distributions may be applied for the hypothesis at other locations (for example, the above block), where weights may be modulated based on directions of prediction.

k. Lists with i>1 could be restricted to use only one reference index. In this case, no signalling of the reference index for these lists would be necessary.

l. Motion vectors for a particular list may be limited to values within a defined window around the (0,0) motion vector, that is known to the decoder. Such limitations may contribute to better data prefetch operations at a decoder for motion compensation using more than 2 hypotheses.

m. Subpixel motion compensation may be limited for multihypothesis prediction. For example, multihypothesis prediction may be limited to only $\frac{1}{8}^{th}$, quarter, half pel, or integer precision. Integer prediction could also be further restricted to certain integer multiples, e.g. multiples of 2, 3, 4, etc, or in general powers of 2. Such restrictions could be imposed on all lists if more hypotheses than 2 are used, or only on certain lists, e.g. list i>1, or list combinations, e.g. whenever list 2 is used all lists are restricted to half pel precision. If such precision is used, and if these methods are combined with implicit motion vector derivation from another list, appropriate quantization and clipping of the derived motion parameters may be performed.

n. Limitations could also be imposed on the filters used for subpixel prediction, i.e. in the number of filter taps that will be used to generate those samples. For example, for unior bi-prediction, a coding syntax may permit 8 tap filters to be used, but for multihypothesis prediction with more than 2 references only 4 tap or bilinear filtering may be permitted for all lists. The filters could also be selected based on the list index. The limitations could be based on block size as well, i.e. for larger partitions longer filters may be used, but the size of the filters may be limited for smaller partitions.

o. Limitations on the filters could also be imposed differently on luma vs chroma components.

All of the above conditions could be implicitly designed in the codec, or could be signalled in higher syntax levels of the codec, such as sequence, picture parameter sets, or slice headers.

Different ones of foregoing techniques may be applied in a coding syntax for prediction blocks of different size. For example, for larger partitions, the cost of signalling additional motion parameters is small. However, for smaller partitions that cost can be significant. Therefore, for larger partitions, e.g. 16×16 and above, explicit motion signalling of lists i>1 may be permitted, but, for partition sizes smaller than 16×16, derivation may be implicit.

The principles of the foregoing aspects may be used cooperatively with other types of coding techniques. For example, merge and skip modes can also be supported in such codecs, and the derivation of the appropriate motion parameters discussed above may be extended to these modes as well.

Motion Compensated Prediction with Hierarchical Multihypothesis

The foregoing techniques find application in coding systems where video data is coded in recursively-partitioned pixel blocks. For example, HEVC and some other coding systems partition a frame of input data first into a Coding Tree Unit (CTU), also called as the Largest Coding Unit (commonly, an "LCU"), of a predetermined size (say, 64×64 pixels). Each CTU may be partitioned into increasingly smaller pixel blocks back on content contained therein. When the partitioning is completed, relationships of the CTUs and the coding units ("CUs") contained within them may represent a hierarchical tree data structure. Moreover, prediction units ("PUs") may be provided for the CUs at leaf nodes of the tree structure; the PUs may carry prediction information such as coding mode information, motion vectors, weighted prediction parameters, and the like.

As discussed, aspects of the present disclosure extend multi-hypothesis prediction to provide for different coding hypotheses at different block sizes. For example, a block of size (2M)×(2M) can be designated as a bi-predicted block but, for each M×M subblock, different motion parameters can be signalled for each hypothesis/list. Furthermore, it is possible that one of the hypotheses/lists would be fixed within the entire block, whereas, for the second hypothesis, further subpartitioning may be performed. In such a scenario, an encoder can keep one of the hypotheses fixed for a larger area, while searching for the second hypothesis using smaller regions. Similarly, a decoder may use hypothesis information to determine whether it should "prefetch" the entire larger area in memory for generating the first hypothesis, whereas for the second hypothesis smaller areas could be brought into memory and then combined with the first hypothesis to generate the final prediction.

Aspects of the present disclosure introduce a new prediction mode, called the "hierarchical multihypothesis" mode, which can be added in addition to the existing single list/unipredictive and bipredictive prediction modes available in existing codecs. For example, in HEVC, the parameter inter_pred_idc[x0][y0] may be expanded to indicate that additional subpartitioning is permitted for a block for any of the hypotheses and lists, i.e. List0, List1, or both. If such subpartitioning is permitted for only one of the hypotheses/lists, e.g. List0, then for the other list, e.g. List1, its associated parameters can be signalled immediately, e.g. within a prediction unit, whereas for the first hypothesis/list the signalling of said parameters would have to be done in combination with its partitioning.

In a further aspect, subpartitions may include syntax elements to identify a null prediction which indicates that the additional hypothesis from the current list will not be considered for this subpartition. It may also be possible to signal syntax elements that will indicate the use of intra prediction instead of inter prediction in combination with or instead of other inter hypotheses for that subpartition.

In HEVC, the hierarchical nature of the codec may induce overhead for signalling the prediction mode information, which ordinarily is provided in prediction units that are identified from leaf nodes of coding unit tress. Aspects of the present disclosure provide several techniques to reduce signalling overhead.

In one aspect, the signalling of inter_pred_idc may be provided at higher levels of the coding_quadtree syntax than the prediction unit. The following syntax tables, demonstrate an example of how this could be done. In this particular example, a parameter named "quadtree_mode_enable_flag" may be provided at a sequence, picture, or slice level in a coding syntax that indicates whether the inter_pred_idc designations are provided at higher levels within the coding_quadtree syntax. If the quadtree_mode_enable_flag value is set to TRUE (1), for example, it may indicate that inter_pred_idc designations are so provided. The encoder may signal the inter prediction mode and the split flags in such higher level constructs, for example, in sequence, picture, or slice level itself, thus reducing the signalled overhead. In this particular example, intra prediction modes are not used within subpartitions, thus reducing overhead further.

Table 5 provides an exemplary coding quadtree syntax provided in an HEVC-style coding application. The values split_cu_l0_flag[x0][y0], split_cu_l1_flag[x0][y0] and split_cu_flag[x0][y0] respectively indicate whether and how a CU may be further partitioned. The inter_pred_idc[x0][y0] may identify a prediction mode of all sub-partitions contained within the CU where it is identified.

TABLE 5

| Exemplary Coding Quadtree Syntax | Descriptor |
|---|---|
| coding_quadtree( x0, y0, log2CbSize, cqtDepth ) { | |
|   if( x0 + ( 1 << log2CbSize ) <= pic_width_in_luma_samples && | |
|     y0 + ( 1 << log2CbSize ) <= pic_height_in_luma_samples && | |
|     log2CbSize > MinCbLog2SizeY ) | |
|     if (quadtree_mode_enable_flag = = 1 && slice_type = = B ) | |
|       enable_ctu_mode_flag | ae(v) |
|     else | |
|       enable_ctu_mode_flag = 0 | |
|     if (enable_ctu_mode_flag == 1) { | |
|       inter_pred_idc[ x0 ][ y0 ] | ae(v) |
|       if ( inter_pred_idc[ x0 ][ y0 ] == PRED_HIER_BI) { | |
|         split_cu_l0_flag[ x0 ][ y0 ] | ae(v) |
|         split_cu_l1_flag[ x0 ][ y0 ] | ae(v) |
|         IsHierSplitMode = 1 | |
|       } | |
|       else | |

TABLE 5-continued

Exemplary Coding Quadtree Syntax

| | Descriptor |
|---|---|
|       split_cu_flag[ x0 ][ y0 ]<br>    }<br>  else {<br>    split_cu_flag[ x0 ][ y0 ]<br>  } | ae(v)<br><br><br>ae(v) |

```
if( cu_qp_delta_enabled_flag && log2CbSize >= Log2MinCuQpDeltaSize ) {
  IsCuQpDeltaCoded = 0
  CuQpDeltaVal = 0
}
if( cu_chroma_qp_offset_enabled_flag &&
log2CbSize >= Log2MinCuChromaQpOffsetSize )
  IsCuChromaQpOffsetCoded = 0
if (quadtree_mode_enable = = 1 && slice_type = = B) {
  if ( IsHierSplitMode == 1 ) {
    quadtree_splitting( split_cu_l0_flag[ x0 ][ y0 ], PRED_L0,
      x0, y0, log2CbSize, cqtDepth )
    quadtree_splitting( split_cu_l1_flag[ x0 ][ y0 ], PRED_L1,
      x0, y0, log2CbSize, cqtDepth )
  }
  else {
    quadtree_splitting( split_cu_flag[ x0 ][ y0 ], inter_pred_idc[ x0 ][ y0 ],
      x0, y0, log2CbSize, cqtDepth )
  }
else {
  if( split_cu_flag[ x0 ][ y0 ] ) {
    x1 = x0 + ( 1 << (log2CbSize − 1 ) )
    y1 = y0 + ( 1 << (log2CbSize − 1 ) )
    coding_quadtree( x0, y0, log2CbSize − 1, cqtDepth + 1 )
    if( x1 < pic_width_in_luma_samples )
      coding_quadtree( x1, y0, log2CbSize − 1, cqtDepth + 1 )
    if( y1 < pic_height_in_luma_samples )
      coding_quadtree( x0, y1, log2CbSize − 1, cqtDepth + 1 )
    if( x1 < pic_width_in_luma_samples && y1 < pic_height_in_luma_samples )
      coding_quadtree( x1, y1, log2CbSize − 1, cqtDepth + 1 )
  } else
    coding_unit( x0, y0, log2CbSize )
  }
}
```

Table 6 illustrates an exemplary quadtree splitting syntax, again, working from an HEVC-style coding syntax. This new syntax is utilized when the independent splitting mode for each list is enabled. Otherwise the original quadtree method, as is used in HEVC, is used. As indicated, coding_quadtree_list values may be derived from the inter_pred_idc value, which is signalled in the coding_quadtree syntax. The corresponding list is also passed into this syntax since this will be later used to determine which information, i.e. motion vectors from which corresponding list, will need to be signalled.

TABLE 6

Quadtree Splitting Syntax

| | Descriptor |
|---|---|

```
quadtree_splitting( split_cu_flag , current_list, x0, y0, log2CbSize, cqtDepth ) {
  if( split_cu_flag) {
    x1 = x0 + ( 1 << ( log2CbSize − 1 ) )
    y1 = y0 + ( 1 << ( log2CbSize − 1 ) )
    coding_quadtree_list( current_list, x0, y0, log2CbSize − 1, cqtDepth + 1 )
    if( x1 < pic_width_in_luma_samples )
      coding_quadtree_list( current_list, x1, y0, log2CbSize − 1, cqtDepth + 1 )
    if( y1 < pic_height_in_luma_samples )
      coding_quadtree_list( current_list, x0, y1, log2CbSize − 1, cqtDepth + 1 )
    if( x1 < pic_width_in_luma_samples && y1 < pic_height_in_luma_samples )
      coding_quadtree_list( current_list, x1, y1, log2CbSize − 1, cqtDepth + 1 )
  } else
    coding_unit_list( current_list, x0, y0, log2CbSize )
}
```

Table 7 illustrates coding quadtree list syntax, which shows a further use of the split_cu_flag to indicate whether the respective coding unit for the list current_list may be split further for multihypothesis coding. Here, the current_list value is passed from higher level syntactic elements.

TABLE 7

Coding Quadtree List Syntax

| | Descriptor |
|---|---|
| coding_quadtree_list( current_list, x0, y0, log2CbSize, cqtDepth ) { <br>  if( x0 + ( 1 << log2CbSize ) <= pic_width_in_luma_samples && <br>    y0 + ( 1 << log2CbSize ) <= pic_height_in_luma_samples && <br>    log2CbSize > MinCbLog2SizeY ) <br>    split_cu_flag[ x0 ][ y0 ] <br>  if( cu_qp_delta_enabled_flag && log2CbSize >= Log2MinCuQpDeltaSize ) { <br>    IsCuQpDeltaCoded = 0 <br>    CuQpDeltaVal = 0 <br>  } <br>  if( cu_chroma_qp_offset_enabled_flag && <br>    log2CbSize >= Log2MinCuChromaQpOffsetSize ) <br>    IsCuChromaQpOffsetCoded = 0 <br>  quadtree_splitting( split_cu_flag[ x0 ][ y0 ], current_list, <br>x0, y0, log2CbSize, cqtDepth ) <br>} | ae(v) |

Table 8 illustrates an exemplary coding unit list syntax, which makes use of the current_list value as passed from higher level syntactic elements. Here, derivation of prediction_unit_list parameters may use the current_list value from higher level syntactic elements.

TABLE 8

Coding Unit List Syntax

| | Descriptor |
|---|---|
| coding_unit_list( current_list, x0, y0, log2CbSize ) { <br>  if( transquant_bypass_enabled_flag ) <br>    cu_transquant_bypass_flag <br>  cu_skip_flag[ x0 ][ y0 ] <br>  nCbS = ( 1 << log2CbSize ) <br>  if( cu_skip_flag[ x0 ][ y0 ] ) <br>    prediction_unit_list( current_list, x0, y0, nCbS, nCbS ) <br>  else { <br>    part_mode <br>    if( PartMode = = PART_2Nx2N ) <br>      prediction_unit_list ( current_list,x0, y0, nCbS, nCbS ) <br>    else if( PartMode = = PART_2NxN ) { <br>      prediction_unit_list ( current_list,x0, y0, nCbS, nCbS / 2 ) <br>      prediction_unit_list ( current_list,x0, y0 + ( nCbS / 2 ), nCbS, nCbS / 2 ) <br>    } else if( PartMode = = PART_Nx2N ) { <br>      prediction_unit_list ( current_list,x0, y0, nCbS / 2, nCbS ) <br>      prediction_unit_list ( current_list,x0 + ( nCbS / 2 ), y0, nCbS / 2, nCbS ) <br>    } else if( PartMode = = PART_2NxnU ) { <br>      prediction_unit_list ( current_list,x0, y0, nCbS, nCbS / 4 ) <br>      prediction_unit_list ( current_list,x0, y0 + ( nCbS / 4 ), nCbS, nCbS * 3 / 4 ) <br>    } else if( PartMode = = PART_2NxnD ) { <br>      prediction_unit_list ( current_list,x0, y0, nCbS, nCbS * 3 / 4 ) <br>      prediction_unit_list ( current_list,x0, y0 + ( nCbS * 3 / 4 ), nCbS, nCbS / 4 ) <br>    } else if( PartMode = = PART_nLx2N ) { <br>      prediction_unit_list ( current_list,x0, y0, nCbS / 4, nCbS ) <br>      prediction_unit_list ( current_list,x0 + ( nCbS / 4 ), y0, nCbS *3/4, nCbS ) <br>    } else if( PartMode = = PART_nRx2N ) { <br>      prediction_unit_list ( current_list,x0, y0, nCbS * 3/4, nCbS ) <br>      prediction_unit_list ( current_list,x0 + ( nCbS * 3 / 4 ), y0, nCbS / 4, nCbS ) | ae(v) <br><br> ae(v) <br> ae(v) <br><br><br><br><br><br> ae(v) |

TABLE 8-continued

Coding Unit List Syntax

|  | Descriptor |
|---|---|
| ``} else {/* PART_NxN */``<br>``    prediction_unit_list ( current_list,x0, y0, nCbS / 2, nCbS / 2 )``<br>``    prediction_unit_list ( current_list,x0 + ( nCbS / 2), y0, nCbS / 2, nCbS / 2 )``<br>``    prediction_unit_list ( current_list,x0, y0 + ( nCbS / 2 ), nCbS / 2, nCbS / 2 )``<br>``    prediction_unit_list``<br>``( current_list,x0 + ( nCbS / 2 ), y0 + ( nCbS / 2 ), nCbS / 2, nCbS / 2 )``<br>``    }``<br>``  }``<br>``}`` |  |

Table 9 illustrates an exemplary syntax for coding prediction units in an aspect of the present disclosure. In this aspect, values of ref_idx_l0, mvp_l0_flag, ref_idx_l1, mvp_l1_flag are signalled at the encoder and known to be decoded at the decoder for only the list current_list, which is passed to the prediction_unit_list process from higher level syntactic elements. This is different from legacy prediction units where the mode was indicated within the prediction unit, and which would indicate whether list0 only, list1 only, or biprediction shall be used and the related parameters will be signalled together within the same prediction unit.

TABLE 9

Prediction Unit List Syntax

|  | Descriptor |
|---|---|
| ``prediction_unit_list( current_list, x0, y0, nPbW, nPbH ) {`` |  |
| ``  if( cu_skip_flag[ x0 ][ y0 ] ) {`` |  |
| ``    if( MaxNumMergeCand > 1 )`` |  |
| ``      merge_idx[ x0 ][ y0 ]`` | ae(v) |
| ``  } else { /* MODE_INTER */`` |  |
| ``    merge_flag[ x0 ][ y0 ]`` | ae(v) |
| ``    if( merge_flag[ x0 ][ y0 ] ) {`` |  |
| ``      if( MaxNumMergeCand > 1 )`` |  |
| ``        merge_idx[ x0 ][ y0 ]`` | ae(v) |
| ``    } else {`` |  |
| ``      if(current_list != PRED_L1 ) {`` |  |
| ``        if( num_ref_idx_l0_active_minus1 > 0 )`` |  |
| ``          ref_idx_l0[ x0 ][ y0 ]`` | ae(v) |
| ``        mvd_coding( x0, y0, 0 )`` |  |
| ``        mvp_l0_flag[ x0 ][ y0 ]`` | ae(v) |
| ``      }`` |  |
| ``      if(current_list != PRED_L0 ) {`` |  |
| ``        if( num_ref_idx_l1_active_minus1 > 0 )`` |  |
| ``          ref_idx_l1[ x0 ][ y0 ]`` | ae(v) |
| ``        if( mvd_l1_zero_flag && inter_pred_idc = = PRED_BI ) {`` |  |
| ``          MvdL1[ x0 ][ y0 ][ 0 ] = 0`` |  |
| ``          MvdL1[ x0 ][ y0 ][ 1 ] = 0`` |  |
| ``        } else`` |  |
| ``          mvd_coding( x0, y0, 1 )`` |  |
| ``        mvp_l1_flag[ x0 ][ y0 ]`` | ae(v) |
| ``      }`` |  |
| ``    }`` |  |
| ``  }`` |  |
| ``}`` |  |

Although not shown above, the foregoing principles may be extended to signalling of local illumination parameters, also. Moreover, the principles may be extended to other coding blocks such as transform coding, overlapped block motion compensation, and deblocking. Transform coding for example in HEVC can be performed independently from the specifications of the prediction units.

In another aspect, overhead signalling may be limited even further by constraining subpartitioning in hierarchical multihypothesis prediction to one and only one of the lists. When a multiple hypothesis coding mode is selected, then, for one of the lists, the partitioning may be fixed. In such a case, no special indication flag would be needed, and a single set of motion parameters would be sent for one list, whereas, for the other list(s), the syntax may accommodate further subpartitioning and signalling of additional parameters. Such aspects may be built into coding rules for the syntax, in which case the constraint would be enforced always. Alternatively, the constraint may be activated dynamically by an encoder, in which case it would also be signalled at higher-level constructs within a coding syntax (e.g., the sequence, picture, or slice headers). Moreover, the depth subpartitioning of each list may be signalled at a similar level. Such depth could also be associated with the depth of the coding unit, in which case, further subdivision of a coding unit would not occur beyond a certain block size. Such constraints may have an impact on when an encoder sends split flag parameters in the stream. If for example, an encoder reaches the maximum splitting depth, no additional split flags need to be transmitted.

Prediction List Signalling for Bipredictively and MHMC-Coded Pixel Blocks

In another aspect, coding syntax may include elements that identify prediction lists that are to be used for pixel blocks. Some coding protocols organize prediction references for bipredictively-coded pixel blocks into lists, commonly represented as "List0" and "List1." and identify reference frames for prediction using indexes into such lists. Aspects of the present disclosure, however, introduce signalling at higher levels of a syntax (e.g., at the sequence, picture, slice header, coding tree unit level (or coding unit groups of a certain size in a codec such as HEVC, or macroblocks in a codec like MPEG-4 AVC)), of whether a given list prediction is present in a lower coding unit within the higher level. The signalling may be provided as an "implicit prediction" flag that, when activated for a given list, indicates that the list is to be used for coding of the pixel blocks referenced by the sequence, slice, etc.

Table 10 provides an example of syntax that may indicate whether prediction lists are present for bipredictively-coded pixel blocks. In this example, the syntax is provided as part of signalling of a slice.

TABLE 10

Exemplary Slice Segment Syntax

| | Descriptor |
|---|---|
| slice_segment_header( ) { | |
| ... | |
| if (slice_type == B) { | |
|   list0_prediction_implicit_present_flag | u(1) |
|   list1_prediction_implicit_present_flag | u(1) |
| } | |

In this example, when either of list0_prediction_implicit_present_flag or list1_prediction_implicit_present_flag are set, it indicates that the respective list (e.g., List0, List 1) data is always present for coding of the pixel blocks contained within the slice. Again, the syntax may be provided for other syntactic elements in coded video data, such as a sequence, a picture, a coding tree unit level or other coding unit groups. Table 12 below also illustrates application of the implicit prediction flag syntax to an exemplary HEVC-style slice syntactic element.

In this manner, for those prediction lists for which the implicit prediction flag is set to TRUE, it is no longer required to provide prediction indications in the data of the coded pixel blocks (for example, a prediction unit) themselves. These flags, when indicated, imply that always that prediction list would be used. For example, if list0_prediction_implicit_present_flag is set, then an inter-predicted block in that slice (excluding Intra, SKIP, and MERGE predicted blocks), would be either a unipredicted block using List0 or a bipredicted block using List0 and another prediction reference. An inter-predicted block could not be a unipredicted block using List1 only. Similarly, if list1_prediction_implicit_present_flag is set, then a block in that slice would be either a unipredicted block using List1 or a bipredicted block using List1 and another prediction reference. If both flags are set TRUE, then the corresponding blocks can only use biprediction using both List0 and List 1.

The principles of the implicit prediction flags may be extended to MHMC coding using a higher number N of hypotheses (N>2). In such a case, implicit prediction flags may be provided for the list corresponding to each hypothesis. A list_prediction_implicit_present_flag[i] is shown, for example, in Table 1. When a list_prediction_implicit_present_flag[i] is set for a hypothesis i, it signifies that the associated prediction list (e.g., a List$_i$) will be used for coding of pixel blocks contained within the respective syntactic elements (e.g., the sequence, picture, slice, etc.).

It is expected that, by placing the implicit prediction flags in syntactic elements of coded video data that are at higher levels than the coding data of individual pixel blocks (for example, individual prediction units), the bitrate cost of signalling prediction types will be lowered.

Table 11, for example, indicates how syntax of an HEVC-style prediction unit might be simplified using the implicit prediction flags:

TABLE 11

Exemplary HEVC-style Prediction Unit Syntax Modified
To Accommodate Implicit Prediction Flags

| | Descriptor |
|---|---|
| prediction_unit( x0, y0, nPbW, nPbH ) { | |
|   if( cu_skip_flag[ x0 ][ y0 ] ) { | |
|     if( MaxNumMergeCand > 1 ) | |
|       merge_idx[ x0 ][ y0 ] | ae(v) |
|   } else { /* MODE_INTER */ | |

TABLE 11-continued

Exemplary HEVC-style Prediction Unit Syntax Modified
To Accommodate Implicit Prediction Flags

| | Descriptor |
|---|---|
| merge_flag[ x0 ][ y0 ] | ae(v) |
| if( merge_flag[ x0 ][ y0 ] ) { | |
|   if( MaxNumMergeCand > 1 ) | |
|     merge_idx[ x0 ][ y0 ] | ae(v) |
| } else { | |
|   if( slice_type == B ) { | |
|     if( list0_prediction_implicit_present_flag == 0) | |
|       list0_pred_idc_flag[ x0 ][ y0 ] | ae(v) |
|     else | |
|       list0_pred_idc_flag[ x0 ][ y0 ] = 1 | |
|     if( list1_prediction_implicit_present_flag == 0 && list0_pred_idc_flag == 1) | |
|     /* if list0 is not to be used, it implicitly signals that list1 has to be used and thus avoid signalling */ | |
|       list1_pred_idc_flag[ x0 ][ y0 ] | ae(v) |
|     else | |
|       list1_pred_idc_flag[ x0 ][ y0 ] = 1 | |
|   } else { /* slice_type == P */ | |
|     list0_pred_idc_flag[ x0 ][ y0 ] = 1 | |
|     list1_pred_idc_flag[ x0 ][ y0 ] = 0 | |
|   } | |
|   if( list0_pred_idc_flag[ x0 ][ y0 ] == 1 ) { | |
|     if( num_ref_idx_l0_active_minus1 > 0 ) | |
|       ref_idx_l0[ x0 ][ y0 ] | ae(v) |
|     mvd_coding(x0, y0, 0 ) | |
|     mvp_l0_flag[ x0 ][ y0 ] | ae(v) |
|   } | |
|   if( list1_pred_idc_flag[ x0 ][ y0 ] == 1 ) { | |
|     if( num_ref_idx_l1_active_minus1 > 0 ) | |
|       ref_idx_l1[ x0 ][ y0 ] | ae(v) |
|     if( mvd_l1_zero_flag && list0_pred_idc_flag[ x0 ][ y0 ] == 1 ) { | |
|       MvdL1[ x0 ][ y0 ][ 0 ] = 0 | |
|       MvdL1[ x0 ][ y0 ][ 1 ] = 0 | |
|     } else | |
|       mvd_coding( x0, y0, 1 ) | |
|     mvp_l1_flag[ x0 ][ y0 ] | ae(v) |
|   } | |
|  } | |
| } | |

As shown above, when the list0_prediction_implicit_present_flag is set to TRUE, then prediction unit syntax will not include the flag list0_pred_idc_flag[x0][y0]. Ordinarily, the list0_pred_idc_flag[x0] [y0] specifies whether list0 used for the current prediction unit. In this case this is already known from a higher layer. Similarly, when the list1_prediction_implicit_present_flag is set to TRUE, then prediction unit syntax will not include the flag list1_pred_idc_flag[x0][y0]. As noted in Table 11, when list0 is not to be used (list0_pred_idc_flag≠1), it signals implicitly that list1 has to be used and thus signalling of list1_pred_idc_flag[x0][y0] can be avoided in such a case.

Table 12 illustrates the syntax of Table 1 applied to an exemplary slice segment header, which is derived from the HEVC protocol:

TABLE 12

Slice Segment Header To Support Multihypothesis Prediction

| | Descriptor |
|---|---|
| slice_segment_header( ) { | |
|   first_slice_segment_in_pic_flag | u(1) |
|   if( nal_unit_type >= BLA_W_LP && nal_unit_type <= RSV_IRAP_VCL23 ) | |
|     no_output_of_prior_pics_flag | u(1) |
|   slice_pic_parameter_set_id | ue(v) |
|   if( !first_slice_segment_in_pic_flag ) { | |
|     if( dependent_slice_segments_enabled_flag ) | |
|       dependent_slice_segment_flag | u(1) |
|     slice_segment_address | u(v) |
|   } | |
|   if( !dependent_slice_segment_flag ) { | |
|     for( i = 0; i < num_extra_slice_header_bits; i++ ) | |
|       slice_reserved_flag[ i ] | u(1) |
|     slice_type | ue(v) |
|     if( slice_type == MH ) { | |

TABLE 12-continued

Slice Segment Header To Support Multihypothesis Prediction

| | Descriptor |
|---|---|
|     number_of_lists_minus2 | ue(v) |
|     for( i = 0; i < number_of_lists_minus2 + 2; i++ ) { | |
|       list_prediction_implicit_present_flag[i] | u(1) |
|       log2_min_luma_hypothesis_block_size_minus2 [i] | ue(v) |
|       log2_diff_max_min_luma_hypothesis_block_size [i] | ue(v) |
|     } | |
|   } | |
|   else { /* slice_type == P */ | |
|     number_of_lists_minus2 = −1 | |
|     list_prediction_implicit_present_flag[ 0 ] = 1 | |
|   } | |
| if( output_flag_present_flag ) | |
|   pic_output_flag | u(1) |
| if( separate_colour_plane_flag == 1 ) | |
|   colour_plane_id | u(2) |
| if( nal_unit_type != IDR_W_RADL && nal_unit_type != IDR_N_LP ) { | |
|   slice_pic_order_cnt_lsb | u(v) |
|   short_term_ref_pic_set_sps_flag | u(1) |
|   if( !short_term_ref_pic_set_sps_flag ) | |
|     st_ref_pic_set( num_short_term_ref_pic_sets ) | |
|   else if( num_short_term_ref_pic_sets > 1 ) | |
|     short_term_ref_pic_set_idx | u(v) |
|   if( long_term_ref_pics_present_flag ) { | |
|     if( num_long_term_ref_pics_sps > 0 ) | |
|       num_long_term_sps | ue(v) |
|     num_long_term_pics | ue(v) |
|     for( i = 0; i < num_long_term_sps + num_long_term_pics; i++ ) { | |
|       if( i < num_long_term_sps ) { | |
|         if( num_long_term_ref_pics_sps > 1 ) | |
|           lt_idx_sps[ i ] | u(v) |
|       } else { | |
|         poc_lsb_lt[ i ] | u(v) |
|         used_by_curr_pic_lt_flag[ i ] | u(1) |
|       } | |
|       delta_poc_msb_present_flag[ i ] | u(1) |
|       if( delta_poc_msb_present_flag[ i ] ) | |
|         delta_poc_msb_cycle_lt[ i ] | ue(v) |
|     } | |
|   } | |
|   if( sps_temporal_mvp_enabled_flag ) | |
|     slice_temporal_mvp_enabled_flag | u(1) |
| } | |
| if( sample_adaptive_offset_enabled_flag ) { | |
|   slice_sao_luma_flag | u(1) |
|   if( ChromaArrayType != 0 ) | |
|     slice_sao_chroma_flag | u(1) |
| } | |
| if( slice_type == P | | slice_type == MH ) { | |
|   num_ref_idx_active_override_flag | u(1) |
|   if( num_ref_idx_active_override_flag ) { | |
|     for( i = 0; i < number_of_lists_minus2 + 2; i++ ) | |
|       num_ref_idx_ active_minus1_list[ i ] | ue(v) |
|   } | |
|   if( lists_modification_present_flag && NumPicTotalCurr > 1 ) | |
|     ref_pic_lists_modification( ) | |
|   mvd_list_zero_flag[ 0 ] = 0 | |
|   for( i = 1; i < number_of_lists_minus2 + 2; i++ ) | |
|     mvd_list_zero_flag[ i ] | u(1) |
|   if( cabac_init_present_flag ) | |
|     cabac_init_flag | u(1) |
|   if( slice_temporal_mvp_enabled_flag ) { | |
|     if( slice_type == MH ) | |
|       collocated_from_list | ue(v) |
|     else | |
|       collocated_from_list = 0 | ue(v) |
|     if( (num_ref_idx_active_minus1_list[ collocated_from_list ] > 0 ) | |
|       collocated_ref_idx | ue(v) |
|   } | |
|   if( ( weighted_pred_flag && slice_type == P) | | | |
|     ( weighted_mh_pred_flag && slice_type == MH ) ) | |
|     pred_weight_table( ) | |
|   five_minus_max_num_merge_cand | ue(v) |
|   if( motion_vector_resolution_control_idc == 2 ) | |
|     use_integer_mv_flag | u(1) |
| } | |

TABLE 12-continued

Slice Segment Header To Support Multihypothesis Prediction

| | Descriptor |
|---|---|
| slice_qp_delta | se(v) |
| if( pps_slice_chroma_qp_offsets_present_flag ) { | |
|   slice_cb_qp_offset | se(v) |
|   slice_cr_qp_offset | se(v) |
| } | |
| if( pps_slice_act_qp_offsets_present_flag ) { | |
|   slice_act_y_qp_offset | se(v) |
|   slice_act_cb_qp_offset | se(v) |
|   slice_act_cr_qp_offset | se(v) |
| } | |
| if( chroma_qp_offset_list_enabled_flag ) | |
|   cu_chroma_qp_offset_enabled_flag | u(1) |
| if( deblocking_filter_override_enabled_flag ) | |
|   deblocking_filter_override_flag | u(1) |
| if( deblocking_filter_override_flag ) { | |
|   slice_deblocking_filter_disabled_flag | u(1) |
|   if( !slice_deblocking_filter_disabled_flag ) { | |
|     slice_beta_offset_div2 | se(v) |
|     slice_tc_offset_div2 | se(v) |
|   } | |
| } | |
| if( pps_loop_filter_across_slices_enabled_flag && | |
|   ( slice_sao_luma_flag \|\| slice_sao_chroma_flag \|\| | |
|     !slice_deblocking_filter_disabled_flag ) ) | |
|   slice_loop_filter_across_slices_enabled_flag | u(1) |
| } | |
| if( tiles_enabled_flag \|\| entropy_coding_sync_enabled_flag ) { | |
|   num_entry_point_offsets | ue(v) |
|   if( num_entry_point_offsets > 0 ) { | |
|     offset_len_minus1 | ue(v) |
|     for( i = 0; i < num_entry_point_offsets; i++ ) | |
|       entry_point_offset_minus1[ i ] | u(v) |
|   } | |
| } | |
| if( slice_segment_header_extension_present_flag ) { | |
|   slice_segment_header_extension_length | ue(v) |
|   for( i = 0; i < slice_segment_header_extension_length; i++) | |
|     slice_segment_header_extension_data_byte[ i ] | u(8) |
| } | |
| byte_alignment( ) | |
| } | |

In other aspects, syntax may be developed to identify non-square prediction block sizes, for example, with parameters to define width and height of the minimum and maximum prediction block sizes.

The slice header syntax of Table 12 may lead to a syntax for a prediction unit that can handle multihypothesis slices, as shown in Table 13.

TABLE 13

Prediction Unit Syntax Of HEVC Modified Using The Proposed Method

| | Descriptor |
|---|---|
| prediction_unit( x0, y0, nPbW, nPbH ) { | |
|   if( cu_skip_flag[ x0 ][ y0 ] ) { | |
|     if( MaxNumMergeCand > 1 ) | |
|       merge_idx[ x0 ][ y0 ] | ae(v) |
|   } else { /* MODE_INTER */ | |
|     merge_flag[ x0 ][ y0 ] | ae(v) |
|     if( merge_flag[ x0 ][ y0 ] ) { | |
|       if( MaxNumMergeCand > 1 ) | |
|         merge_idx[ x0 ][ y0 ] | ae(v) |
|     } else { | |
|       set_lists = 0 | |
|       for( i = 0; i < number_of_lists_minus2 + 2; i++ ) { | |
|         if( !list_prediction_implicit_present_flag [ i ] && ( ( i < number_of_lists_minus2 + 1) \|\| set_lists > 0) | |

TABLE 13-continued

Prediction Unit Syntax Of HEVC Modified Using The Proposed Method

| | Descriptor |
|---|---|
|       list_pred_idc_flag[ i ][ x0 ][ y0 ] | ae(v) |
|     else | |
|       list_pred_idc_flag[ i ] [ x0 ][ y0 ] = 1 | |
|     set_lists += list_pred_idc_flag[ i ] [ x0 ][ y0 ] | |
|   } | |
|   for( i = 0; i < number_of_lists_minus2 + 2; i++ ) { | |
|     if( list_pred_idc_flag[ i ] [ x0 ][ y0 ] ) { | |
|       if( num_ref_idx_ active_minus1_list[ i ] > 0 ) | |
|         ref_idx_list[ i ][ x0 ][ y0 ] | ae(v) |
|       if( mvd_list_zero_flag[ i ] && list_pred_idc_flag[ 0 ][ x0 ][ y0 ] ) { | |
|         MvdList[ i ][ x0 ][ y0 ][ 0 ] = 0 | |
|         MvdList[ i ] [ x0 ][ y0 ][ 1 ] = 0 | |
|       } else | |
|         mvd_coding( x0, y0, i ) | |
|       mvp_list_flag[ i ][ x0 ][ y0 ] | ae(v) |
|     } | |
|   } | |
|   } | |
|   } | |
| } | |

Here, again, when the list_prediction_implicit_present_flag [i] of a list i is set to TRUE, then prediction unit syntax will not include the flag list_pred_idc_flag[i][x0][y0].

Other aspects can achieve further conservation of signalling overhead. For example, rather than using the control:

```
if( mvd_list_zero_flag[ i ] && list_pred_idc_flag[ 0 ][ x0 ][ y0 ] ) {
``` a coding syntax may employ an alternate control, as follows:

```
if( mvd_list_zero_flag[ i ] ) {
```

In this aspect, all motion vector differences in list i would be forced to zero, which conserves bitrate that otherwise would be allocated to coding of such elements. However, of course, the motion vector field for this list is considerably constrained.

In another aspect, coding syntax rules may be to set MvdList to zero only when a block is predicted by more than one lists, regardless of which lists are used. For example, the following condition may be applied:

```
if( mvd_list_zero_flag[ i ] && set_lists > 1 ) {
```

This technique increases the flexibility of signalling list prediction for bipredicted and multihypothesis predicted partitions between an encoder and a decoder.

In a further aspect, signalling may be provided at a lower level than a slice unit, that identifies which lists are to be used by also restricting the reference indices of any list[i] to one. Doing so may save bits for uni-prediction or multihypothesis prediction. Such signalling could be applied, for example at fixed CTU intervals. For example, signalling may be provided for N CTUs with N potentially specified at a higher level (such as the sequence parameter sets, picture parameter sets, or a slice, at a CTU level or even lower), but could also be signalled in a new coding unit, e.g. a CTU Grouping unit, that can have an arbitrary number of CTUs, e.g. M, associated with it. Such number could be signalled within the CTU Grouping unit, but could also be omitted and the CTU Grouping unit could contain appropriate termination syntax (Start and end codes) that allows one to determine how many CTUs are contained within.

In such an aspect, coding syntax may provide additional information within a CTU grouping, such as follows:

a. Indications that a particular list index is enabled or disabled for all CTUs in the CTU grouping unit. An encoder also may enable or disable list indices for uni-prediction or multihypothesis prediction if desired.

b. For each enabled list index, indications of whether all reference indices or only one will be used. An encoder may provide such indications independently or jointly for uni-prediction or multihypothesis prediction (i.e. for uni-prediction all references of a particular list could be used and only one for multi-hypothesis prediction if both modes are enabled).

c. If only one reference index is to be used, explicitly selections of which reference index that would be. In this case, if an encoder provides such a selection in a CTU grouping unit, the encoder need not signal the reference index for the blocks contained within the CTU grouping unit.

Motion Vector Prediction Techniques for Multi-Hypothesis Motion Compensation

Other aspects of the present disclosure provide techniques for motion vector prediction both for bipredictive multihypothesis motion compensation (e.g., up to 2 hypotheses) and for multi-hypotheses prediction (N>2).

According to such techniques, a coder may select to use, as predictors, one or more motion vectors of the current block from a list or lists that have already been signalled in the bit stream. For example, assume that, by the time list1 motion vectors are to be coded, list0 motion vector parameters have already been signalled for the current block. In this example, the list1 motion vectors for the same block may be predicted directly from information of the list0 coding, instead of the surrounding partitions. That is, an encoder may compute a predictor vector as $$\overrightarrow{mvpListL1} = \alpha * \overrightarrow{mvListL0} + \vec{\beta} \text{ where} \qquad \text{(Eq. 6)}$$

$\alpha$ is a scaling factor that relates to the distances of the references in L0 and L1 compared to the current picture, and $\vec{\beta}$ is a constant that could be sent at a higher level syntax structure (e.g. the sequence parameter sets, picture parameter sets, or the slice header). The value of α for example, can be computed using the picture order count (poc) information associated with each picture, $$\left(e.g., \text{ as } a = \frac{poc_{ref}[list1][refidxl1] - poc_{cur}}{poc_{ref}[list0][refidxl0] - poc_{cur}}\right).$$

The use of this predictor also may be signalled implicitly, i.e. enabled always for a partition. Further, an encoder may signal which predictor should be used from a possible list of motion vector predictor candidates using a parameter such as a flag. If, for example, this parameter or flag is set to 0, then the collocated vector in the same block from the other list would be used, otherwise another predictor, e.g. a predictor based on a similar derivation as in HEVC, or a median, or averaging candidate of the spatial or temporal neighbourhood motion vectors could be used.

These principles may be extended to hypotheses coming from lists with index higher than 1. In one aspect, prediction could come from list0, if the prediction is always available, or from the lowest index available list used for prediction. In another aspect, signalling may be provided to identify the list that is to be used for predicting the parameters of the current list. Such signalling could be done globally (e.g. at a higher syntax element such as the sequence or picture parameter sets, or the slice header), where an encoder may signal how vectors of a particular list, when used in multi-hypothesis prediction, would be predicted, or done at the block level using a parameter similar to conventional mvp_lx_flag parameters.

In another aspect, an encoder may combine the parameters mvp_lx_flags into a single parameter that signals predictors jointly for all lists. This aspect may reduce signalling overhead as compared to cases in which signalling is provided independently for each hypothesis. That is, instead of signalling that L0 and L1 would use the first predictor using the value of 0 for mvp_l0_flag and mvp_l1_flag independently, in this new parameter mvp_selector, if its value is 0 both lists are selected from the same first predictor. If the value is 1, then both are selected from the second predictor, if that is available, whereas if its value is equal to 2, then for L0 it indicates that an encoder used its first predictor and, for L1, its second predictor and so on. Such correspondence between the value of mvp_selector and which predictor to use for each list could be pre-specified as a syntax coding rule, or it could also be signalled inside the bit stream at a higher syntax element (e.g. in the sequence or picture parameter sets, or the slice header). The mvp_selector could be used with more than 2 lists.

In another aspect, an encoder may entropy code the element mvp_selector using an entropy coding scheme such as UVLC (exp-golomb coding) or Context Adaptive Binary Arithmetic Coding (CABAC). In the case of CABAC, occurrence statistics may be used to update probability statistics and thus how the value is encoded using an adaptive arithmetic encoding engine. With respect to use of CABAC, the statistics collected would be impacted by how many lists are enabled each time. If a single list is to be used, there are only two possible state values for example, whereas if 2 lists are used, then more states are used. To maintain efficiency, an encoder may maintain a table of mvp_selector parameters depending on the number and/or characteristics of combined lists. Adaptation for entropy coding of each entry in the table may be done independently.

In another aspect, a single entry may be maintained, but the statistics may be normalized as coding is performed based on the number of lists used for the current block. If, for example, only uniprediction is to be used, values for mvp_selector above 1 would not make sense. In that case, the normalization would be based only on the number of occurrences of values 0 and 1.

Prediction of motion vectors could also be performed jointly using both neighbouring (spatial and/or temporal) and collocated (motion vectors for the current block but from another list) candidates. In particular, an encoder may use the information of both the mvd (motion vector error) and mvp (motion vector predictor) from the collocated candidate, to derive an mvp for the current list, (e.g., list[i], i=1) as follows:

$$\overrightarrow{mvp_{ListL1}} = \overrightarrow{mvp_{neighbor}} + \frac{\overrightarrow{mvp_{neighbor}}}{\overrightarrow{mvp_{ListL0}}} * \overrightarrow{mvd_{ListL0}} \qquad (\text{Eq. 7})$$

In this derivation, prediction uses both the neighbouring predictor, the predictor of the list0 vector, and its motion vector residual error. In another aspect, the scaling factor for mvd $$\left(\frac{\overrightarrow{mvp_{neighbor}}}{\overrightarrow{mvp_{ListL0}}}\right)$$

could be replaced using a single value that is related to the temporal distances between references. This alternative approach may reduce complexity at the expense of lowered accuracy.

In another aspect, syntax rules may impose the use of a single predictor per list and identify, for the current block, which earlier-encoded list could be used to predict a subsequent list. In such case, the syntax still may permit the use of more than one lists to predict the current list. This could be done, for example, using an averaging, either linear or nonlinear. For example predictors may be derived as:

$$\overrightarrow{mvp_{ListLX}} = \overrightarrow{mvp_{neighbor}} + \frac{1}{X}\sum_{k=0}^{i<X} w_i \frac{\overrightarrow{mvp_{neighbor}}}{\overrightarrow{mvp_{ListL\_i}}} * \overrightarrow{mvd_{ListL\_i}} \qquad (\text{Eq. 8})$$

In the above, $w_i$ are weights that may be either pre-specified by syntax rules or signalled at a higher coding level. The weights $w_i$ need not sum to X (e.g., $\Sigma_{i=0}^{i<X} w_i \neq 1$).

In another aspect, signalling of which mvds to use from earlier lists may be done using an mvp_selector parameter signalled in the prediction unit.

In a further aspect, an encoder may use a single predictor for multiple hypotheses or tie the computation of the predictors for multiple hypotheses together. Such coding decisions may be signalled in the coding bit stream or may be defined by coding rules of its syntax.

In one example, mvp_l0[ref_idx_l0] and mvp_l1[ref_idx_l1] can be tied together. This could be done by signalling which lists and which references will be accounted at the same time at a higher level syntax structure (e.g. the sequence level, the picture level, or the slice level). Such consideration could also be made at a group of CTUs level as well. The relationship between the two mvps could be derived by using a simple scaling factor (scale_factor) that could be signalled explicitly or, alternatively, could be determined by POC differences of the two references. In such as case, instead of forming mvp_l0[ref_idx_l0] from one candidate set and forming mvp_l1[ref_idx_l1] from another candidate set, a decoder can form both at the same time from a combined candidate set. This can be achieved by a variety of ways, for instance if mvp_l0[ref_idx_l0] is computed as median vector of three candidates, the decoder can re-formulate that as minimizing a sum over three terms.

$$\mathrm{argmin}_x\{\Sigma_i|x-mv_{candidates[i]}|\} \quad \text{(Eq. 9)}$$

Now with combined candidates, the decoder minimizes a similar sum with six terms.

In the above mvp_l1[ref_idx_l1] can then be computed as scale_factor*mvp_l0[ref_idx_l0]. Other motion vectors, such as mvp_l0[0:L], can be determined together in a similar fashion. This concept can also be extended to multiple lists (>2).

In another aspect, motion vector prediction of a given pixel block may be predicted from other pixel blocks that are neighbours of the pixel block being coded. A bi-predictive or multihypothesis candidate may be based on pixel blocks in a spatial neighbourhood of the block being coded, which may be represented an index j into a merge_idx list. This candidate j is associated with motion vectors and references for all its lists, e.g. L0 and L1. A coder may introduce an additional candidate, (called j+1), which uses the same predictor for L0, but for L1 only the reference index is reused. For the L1 motion vector candidate, an encoder may scale its motion vectors based on relative temporal displacement between the L1 and the L0 candidates. In another case, an encoder may select a first, unipredicted candidate (e.g. L0), for skip or merge, which has a consequence that no neighbours would provide candidates for another list. In such a case, an encoder may indicate, using merge_idx, a derived candidate for another list (say, L1) given its L0 candidate, which enables biprediction or multihypothesis prediction using another merge_idx.

The foregoing techniques may be extended to coding of Overlapped Block Motion Compensation with multihypothesis prediction as well as affine block motion compensation, for coding systems that support those features.

The foregoing discussion has described operation of the aspects of the present disclosure in the context of video coders and decoders. Commonly, these components are provided as electronic devices. Video decoders and/or controllers can be embodied in integrated circuits, such as application specific integrated circuits, field programmable gate arrays, and/or digital signal processors. Alternatively, they can be embodied in computer programs that execute on camera devices, personal computers, notebook computers, tablet computers, smartphones, or computer servers. Such computer programs typically are stored in physical storage media such as electronic-, magnetic-, and/or optically-based storage devices, where they are read to a processor and executed. Decoders commonly are packaged in consumer electronics devices, such as smartphones, tablet computers, gaming systems, DVD players, portable media players and the like; and they also can be packaged in consumer software applications such as video games, media players, media editors, and the like. And, of course, these components may be provided as hybrid systems that distribute functionality across dedicated hardware components and programmed general-purpose processors, as desired.

Video coders and decoders may exchange video through channels in a variety of ways. They may communicate with each other via communication and/or computer networks as illustrated in FIG. 1. In still other applications, video coders may output video data to storage devices, such as electrical, magnetic and/or optical storage media, which may be provided to decoders sometime later. In such applications, the decoders may retrieve the coded video data from the storage devices and decode it.

Several embodiments of the invention are specifically illustrated and/or described herein. However, it will be appreciated that modifications and variations of the invention are covered by the above teachings and within the purview of the appended claims without departing from the spirit and intended scope of the invention.

We claim:

1. A system for video decoding, comprising:
a syntax decoder for parsing a coded data stream;
a prediction processor for developing hypotheses of pixel blocks;
a prediction synthesizer processor for aggregating hypotheses of pixel blocks;
a pixel block decoder for decoding pixel blocks with respect to corresponding prediction blocks;
a controller for causing the system to:
parse, by the syntax unit, a coded data stream to identify a first count of hypotheses from a syntax layer selected from a group of sequence-level, picture-level, slice-level, segment-level, and group-of-CTUs-level syntax layers, a second count greater than two of prediction lists of reference frames from a slice-level syntax layer, selected prediction lists and selected reference frames in the prediction lists for each hypothesis, and associated prediction data applied to a first pixel block, of an input frame:
generate, by the prediction processor, the first count of prediction blocks as hypotheses for the first pixel block from the prediction data, each prediction block is generated from pixel data of a corresponding selected reference frame in a corresponding selected prediction list associated with a coding hypothesis coded, wherein the first count and the second count are not the same;
aggregate, by the prediction synthesizer processor, the prediction blocks into an aggregate prediction block for the first pixel block; and
decode, by the pixel block decoder, the first pixel block with reference to the aggregate prediction block.

2. The system of claim 1, wherein the aggregating the prediction blocks comprises weighting the prediction data, associated with the respective hypotheses, according to their respective motion vectors.

3. The system of claim 1, wherein the controller further causes the system to, responsive to channel data identifying, for at least one hypothesis, an affine transform, scaling prediction data, associated with the at least one hypothesis, according to the affine transform.

4. The system of claim 1, wherein, for at least one hypothesis, the generating the prediction block comprises:
predicting of a motion vector, of prediction data associated with the at least one hypothesis, based on one or more motion vectors of prediction data associated with one or more other hypotheses.

5. The system of claim 4, wherein the predicting of the motion vector is further based on a temporal distance between the input frame and one or more reference frames associated with the one or more other hypotheses.

6. The system of claim 4, wherein the one or more other hypotheses are hypotheses developed for pixel blocks from a spatiotemporal neighborhood of the pixel block, hypotheses coded based on the identified prediction lists, or a combination thereof.

7. The system of claim 4, wherein the predicting of the motion vector is further based on a trend over time in values of the one or more motion vectors of prediction data associated with the one or more other hypotheses.

8. The system of claim 4, wherein the predicting of the motion vector is further based on chaining, wherein the motion vector references data in a destination frame by aggregating a first motion vector of the input frame, of prediction data associated with one of the one or more other hypotheses, that references an intermediate frame and a second motion vector of an intermediate frame, of prediction data associated with another of the one or more other hypotheses, that references the destination frame.

9. The system of claim 1, wherein the controller further causes the system to, responsive to channel data identifying, for at least one hypothesis, a minimum size of prediction blocks and a maximum size of prediction blocks, the generating prediction block for the at least one hypothesis comprises generating one or more prediction blocks at sizes between the identified minimum and maximum sizes.

10. The system of claim 1, wherein a portion of the coded video stream identifying the prediction lists and the prediction data, are provided within the coded video stream at the level of a sequence, a picture, a slice, a segment, or a group of CTUs.

11. The system of claim 1, wherein the controller further causes the system to, responsive to channel data identifying, for at least one hypothesis, a zero value for motion vector, generating the prediction block for the at least one hypothesis from collocated pixel block of a reference frame provided by the respective prediction list.

12. The system of claim 1, wherein the controller further causes the system to, responsive to channel data identifying, for at least one hypothesis, a skip mode, using collocated pixel block of a reference frame provided by the respective prediction list to restore the pixel block.

13. The system of claim 1, wherein the controller further causes the system to, responsive to channel data identifying, for at least one hypothesis, a merge mode, using prediction data of a pixel block that resides in a reference frame provided by the respective prediction list.

14. The system of claim 1, wherein the controller further causes the system to, responsive to channel data identifying prediction data and an associated collocated list:
generating a further prediction block from the prediction data and the associated collocated list, and aggregating the further prediction block into the aggregate prediction block.

15. The system of claim 1, wherein the controller further causes the system to, responsive to channel data identifying, for at least one hypothesis, a constant value for a component of motion vectors of prediction data associated with the at least one hypothesis, using the constant value for the component of the motion vectors.

16. The system of claim 1, wherein the controller further causes the system to, responsive to channel data identifying, for at least one hypothesis, a constant value for an illumination compensation parameter of prediction data associated with the at least one hypothesis, using the constant value for the illumination compensation parameter.

17. The system of claim 1, wherein at least one of the identified selected prediction list has one reference index.

18. The system of claim 1, wherein the controller further causes the system to, responsive to channel data indicating, for at least one hypothesis that the motion vector is within a predetermined range, generating the prediction block for the at least one hypothesis according to a motion vector within the predetermined range.

19. The system of claim 1, wherein the controller further causes the system to, responsive to channel data identifying, for at least one hypothesis, a pixel increment value for motion vectors, generating the prediction block for the at least one hypothesis using a motion vector set according to the pixel increment value.

20. The system of claim 1, wherein the controller further causes the system to, responsive to channel data identifying, for at least one hypothesis, a sub-pixel increment value for motion vectors, generating the prediction block for the at least one hypothesis using a motion vector set according to the sub-pixel increment value.

21. The system of claim 1, wherein the controller further causes the system to, responsive to channel data identifying a parameter for a sub-pixel prediction filter, filtering the decoded pixel blocks with the sub-pixel prediction filter using the parameter.

22. The system of claim 1, wherein, responsive to channel data indicating, for at least one hypothesis, that the pixel block has been partitioned according to a partition depth, the generating a prediction block comprises generating a prediction block for each partition.

23. The system of claim 1, wherein, responsive to channel data indicating, for at least one hypothesis, that the pixel block has been partitioned according to a predetermined partition depth, the generating a prediction block comprises generating aprediction block for each partition.

24. The system of claim 1, wherein the controller further causes the system to, responsive to channel data identifying a parameter of an in-loop filter, filtering the decoded pixel blocks with the in-loop filter using the parameter.

25. A non-transitory computer readable medium storing a computer program that, when executed by a processor, cause the processor to:
parse a coded data stream to identify a first count of hypotheses from a syntax layer selected from a group of sequence-level, picture-level, slice-level, segment-level, and group-of-CTUs-level syntax layers, a second count greater than two of prediction lists of reference frames from a slice-level syntax layer, selected prediction lists and selected reference frames in the prediction lists for each hypothesis, and associated prediction data applied to a first pixel block, of an input frame;
generate the first count of prediction blocks as hypotheses for the first pixel block from the prediction data, each prediction block is generated from pixel data of a corresponding selected reference frame in a corresponding selected prediction list associated with a coding hypothesis coded, wherein the first count and the second count are not the same;
aggregate the prediction blocks into an aggregate prediction block for the first pixel block; and
decode the first pixel block with reference to the aggregate prediction block.

26. A system for video coding, comprising:
a pixel block coder for differentially coding pixel blocks with respect to corresponding prediction blocks;
a prediction processor for developing hypotheses of pixel blocks;
a prediction synthesizer processor for aggregating hypotheses of pixel blocks;

a syntax unit for generating a coded data stream; and
a controller for causing the system to:
- develop, by the predictorprediction processor, a first count of coding hypotheses for an input pixel block, of an input frame, to be coded, each hypothesis developed by:
  - selecting a prediction list of reference frames, out of a second count greater than two of prediction lists, to be used in coding of the hypothesis, wherein the first and second counts are not the same, and
  - generating a prediction block as a developed hypothesis for the input pixel block from pixel data of a selected reference frame in the selected prediction list, wherein the pixel data and the selected reference frame are identified by prediction data associated with the hypothesis;
- aggregate, by the prediction synthesizer processor, the prediction blocks generated from the developed hypotheses into an aggregate prediction block for the input pixel block;
- code, by the pixel block coder, the input pixel block differentially with reference to the aggregate prediction block; and
- generate, by the syntax unit, a coded data stream with identifiers of the selected prediction lists and associated prediction data for the respective hypotheses and wherein an indication of the first count of coding hypotheses are coded in a syntax layer selected from a group of sequence-level, picture-level, slice-level, segment-level, and group-of-CTUs-level syntax layers, and the second count of prediction lists is coded in a slice-level syntax layer.

27. The system of claim 1, wherein the parsing of the coded data stream further identifies an implicit prediction flag for corresponding prediction lists indicating that a hypothesis is to be generated from the reference frames in the corresponding prediction list.

* * * * *